(12) United States Patent
Mehrotra et al.

(10) Patent No.: US 9,442,929 B2
(45) Date of Patent: Sep. 13, 2016

(54) DETERMINING DOCUMENTS THAT MATCH A QUERY

(71) Applicant: Microsoft Corporation, Redmond, WA (US)

(72) Inventors: Sanjeev Mehrotra, Kirkland, WA (US); Jin Li, Bellevue, WA (US); Abhinav Shrivastava, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 13/764,788

(22) Filed: Feb. 12, 2013

(65) Prior Publication Data

US 2014/0229473 A1 Aug. 14, 2014

(51) Int. Cl.
*G06F 17/30* (2006.01)
(52) U.S. Cl.
CPC ..... *G06F 17/30011* (2013.01); *G06F 17/3069* (2013.01)
(58) Field of Classification Search
CPC ............ G06F 17/30985; G06F 17/3053; G06F 17/30011; G06F 17/3069
USPC ................................. 707/728, 772
See application file for complete search history.

(56) References Cited

U.S. PATENT DOCUMENTS 8,352,494 B1* 1/2013 Badoiu ............. G06F 17/30256
382/224
8,713,021 B2* 4/2014 Bellegarda .......... G06F 17/3071
704/10

2002/0184193 A1 12/2002 Cohen
2012/0215806 A1 8/2012 Pryakhin et al.
2012/0233188 A1 9/2012 Majumdar

OTHER PUBLICATIONS

"International Search Report & Written Opinion for PCT Patent Application No. PCT/US2014/015462", Mailed Date: Aug. 7, 2014, Filed Date: Feb. 10, 2014, 8 pages.
Batko, et al., "Scalability Comparison of Peer-to-Peer similarity search structures", In Future Generation Computer Systems, vol. 24, Issue 8, Oct. 1, 2008, pp. 834-848.
Xu, et al., "Anytime K-Nearest Neighbor Search for Database Applications", In Proceedings of the 2008 IEEE 24th International Conference on Data Engineering Workshop, Apr. 7, 2008, pp. 426-435.
Yianilos, Peter N., "Data Structures and Algorithms for Nearest Neighbor Search in General Metric Spaces", In Proceedings of the fourth annual ACM-SIAM Symposium on Discrete algorithms, Jan. 1, 1993, pp. 311-321.

(Continued)

*Primary Examiner* — Sheree Brown
(74) *Attorney, Agent, or Firm* — Steve Wight; Sandy Swain; Micky Minhas

(57) ABSTRACT

A computer-implemented method and system for determining documents that are nearest to a query are provided herein. The method includes constructing a vantage point tree based on a number of document vectors. The method also includes searching the vantage point tree to determine a number of nearest neighbor document vectors to a query vector by removing a portion of the document vectors from the vantage point tree based on one or more vantage points for each of a number of nodes in the vantage point tree and a specified search radius centered about the query vector.

20 Claims, 18 Drawing Sheets

(56) References Cited

OTHER PUBLICATIONS

Bozkaya, et al., "Indexing Large Metric Spaces for Similarity Search Queries", Retrieved at <<http://citeseerx.ist.psu.edu/viewdoc/download?doi=10.1.1.30.6282&rep=rep1&type=pdf>>, ACM Transactions on Database Systems, Sep. 1999, pp. 34.

Qin, et al., "Hello neighbor: accurate object retrieval with k-reciprocal nearest neighbors", Retrieved at <<http://www.vision.ee.ethz.ch/~qind/0277.pdf>>, IEEE Conference on Computer Vision and Pattern Recognition (CVPR), Jun. 20, 2011, pp. 8.

Cantone, et al., "Antipole Tree Indexing to Support Range Search and K-Nearest Neighbor Search in Metric Spaces", Retrieved at <<http://www.cs.nyu.edu/cs/faculty/shasha/papers/antipolefinaltkde.pdf>>, In IEEE Transactions on Knowledge and Data Engineering, vol. 17, No. 4, Apr. 2005, pp. 16.

Semertzidis, et al., "Multimedia Indexing, Search and Retrieval in Large Databases of Social Networks", Retrieved at <<http://www.iti.gr/iti/files/document/publications/Semertzidis%20et%20al.pdf>>, Retrieved Date: Dec. 24, 2012, pp. 21.

"International Preliminary Report on Patentability Received for PCT Application No. PCT/US2014/015462", Mailed Date: Jun. 17, 2015, 7 pages.

\* cited by examiner

400

700

1100

1700

US 9,442,929 B2

DETERMINING DOCUMENTS THAT MATCH A QUERY

BACKGROUND

Queries are very widely used for information retrieval within computing systems. An important class of query is approximate query, in which the documents are characterized by a feature vector in a high dimension space. A query may specify another feature vector based on another document, and the goal may be to search for documents that are within a certain distance of the presented feature vector, or to find a set of documents that are the nearest to the presented feature vector. In most cases of approximate query, a computing system includes a very large number of documents. Therefore, finding a number of documents that are nearest to, or most closely match, the approximate query may be prohibitively expensive.

SUMMARY

The following presents a simplified summary of the subject innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

An embodiment provides a method for determining documents that are nearest to an approximate query. The method includes constructing a vantage point tree based on a number of document vectors. The method also includes searching the vantage point tree to determine a number of nearest neighbor document vectors to a query vector by removing a portion of the document vectors from the vantage point tree based on one or more vantage points for each of a number of nodes in the vantage point tree and a specified search radius centered about the query vector.

Another embodiment provides a system for determining documents that are nearest to an approximate query. The system includes a processor that is adapted to execute stored instructions and a system memory. The system memory includes code configured to construct a vantage point tree based on a number of document vectors and traverse the vantage point tree using one or more vantage points for each of a number of nodes in the vantage point tree by removing any of the document vectors that are outside a hypersphere of a specified search radius centered about a query vector. The system memory also includes code configured to determine a number of nearest neighbor document vectors to the query vector based on a distance between each remaining document vector and the query vector.

In addition, another embodiment provides one or more computer-readable storage media for storing computer-readable instructions. The computer-readable instructions provide a system for determining documents that are nearest to an approximate query when executed by one or more processing devices. The computer-readable instructions include code configured to construct a vantage point tree based on a number of document vectors and traverse the vantage point tree using one or more vantage points for each of a number of nodes in the vantage point tree by removing a portion of the document vectors from the vantage point tree based on a specified search radius centered about a query vector and a triangle inequality condition. The computer-readable instructions also include code configured to search the vantage point tree to determine a specified number of nearest neighbor document vectors to the query vector.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Embodiments described herein are directed to determining a number of documents that are nearest to an approximate query. More specifically, embodiments described herein are directed to determining a specified number of documents within a large database of documents that approximately match a given query. As used herein, the term "document" is a generic term used for a file, e.g., audio, video, text, pdf, word document, email, HTML, or the like. A document can include the file content itself, associated metadata (such as the geo-location of the file, the date, the time, the names of people in the file, text used to describe the file, or the like), other features extracted from the file (such as SIFT, GIST, HOG, color histograms from the file, or other fingerprints derived from the file), or any combinations thereof. Each document is thus a large collection of words, e.g., text, and numbers, e.g., pixel values, SIFT features, or the like. Furthermore, as used herein, the term "query" refers to some subset of information regarding a document. For example, a query can include the information contained in a document, text used to describe a document, a document including an image from which SIFT or other features can be extracted, the geo-location of a document, or any combinations thereof.

In various embodiments, documents within a large database of documents that are nearest to, or most closely match, a given query are referred to as the "nearest neighbors" for the query. According to embodiments described herein, a "vantage point tree" (or a "multi-vantage point tree") is used to determine a specified number of nearest neighbors for a given query. This may be accomplished in a non-distributed environment, e.g., an environment including only one computing device, or a distributed environment, e.g., an environment including a cluster of computing devices.

Figure 1:
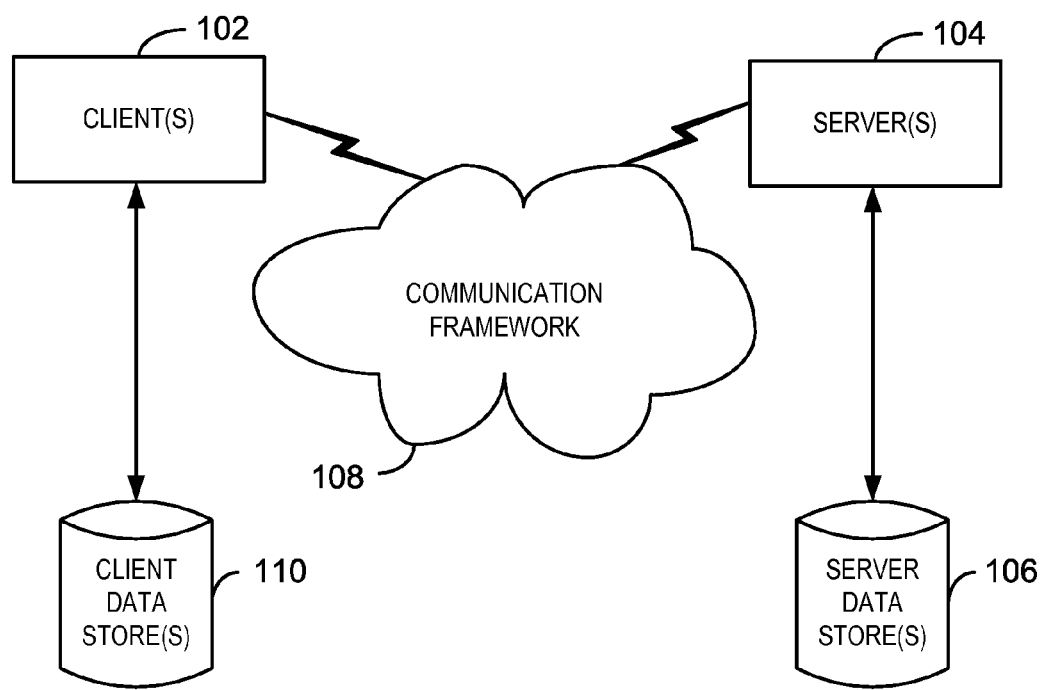
FIG. 1 is a block diagram of a networking environment in which a system and method for determining a number of documents that are nearest to an approximate query may be implemented.

As a preliminary matter, some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As used herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device, or media.

As used herein, terms "component," "search engine," "browser," "server," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Figure 2:
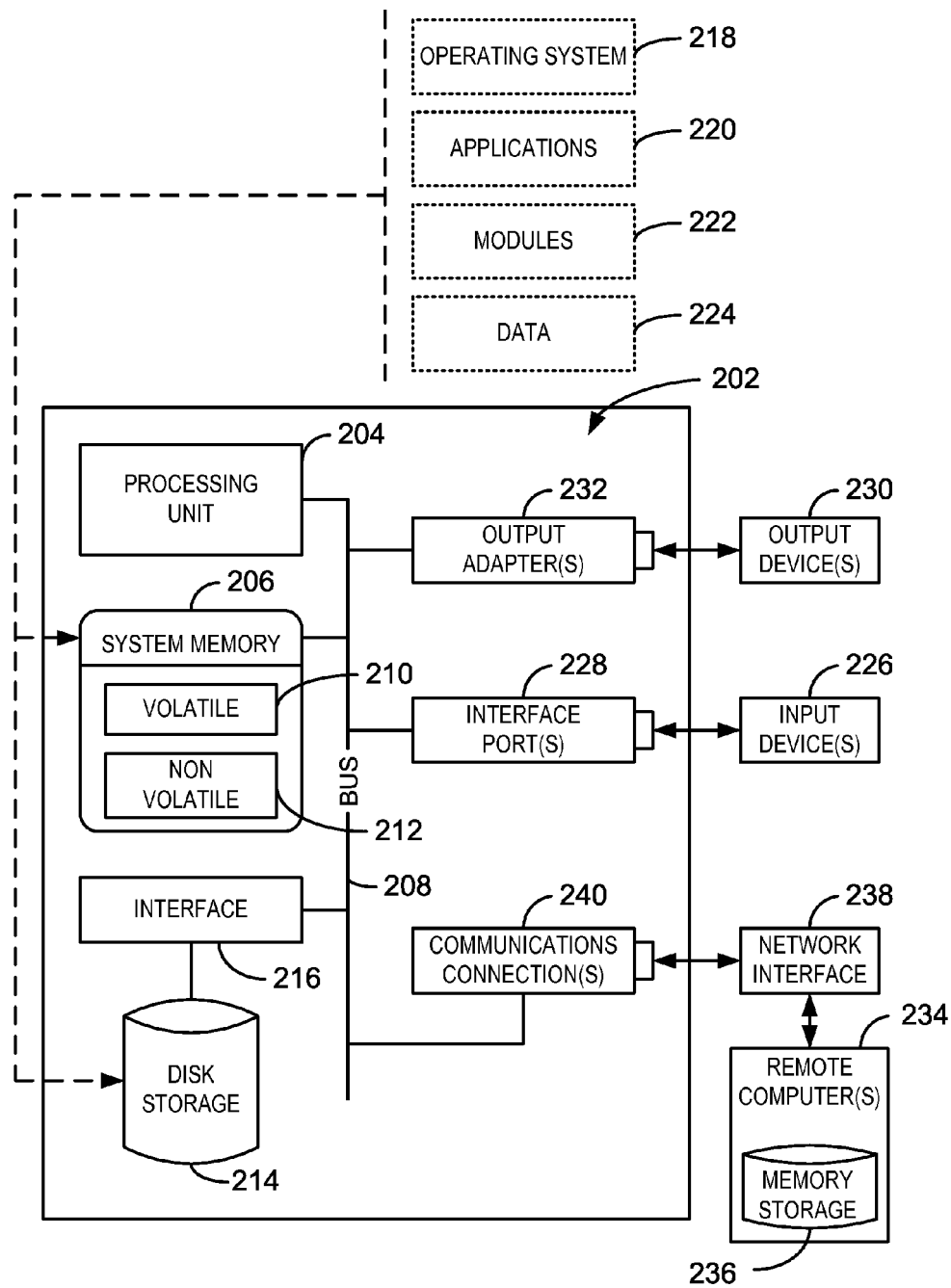
FIG. 2 is a block diagram of a computing environment that may be used to implement a system and method for determining a number of documents that are nearest to an approximate query.

In order to provide context for implementing various aspects of the claimed subject matter, FIGS. 1-2 and the following discussion are intended to provide a brief, general description of a computing environment in which the various aspects of the subject innovation may be implemented. For example, a method and system for determining documents that are nearest to an approximate query can be implemented in such a computing environment. While the claimed subject matter has been described above in the general context of computer-executable instructions of a computer program that runs on a local computer or remote computer, those of skill in the art will recognize that the subject innovation also may be implemented in combination with other program modules. Generally, program modules include routines, programs, components, data structures, etc., that perform particular tasks or implement particular abstract data types.

Moreover, those of skill in the art will appreciate that the subject innovation may be practiced with other computer system configurations, including single-processor or multi-processor computer systems, minicomputers, mainframe computers, as well as personal computers, hand-held computing devices, microprocessor-based or programmable consumer electronics, and the like, each of which may operatively communicate with one or more associated devices. The illustrated aspects of the claimed subject matter may also be practiced in distributed computing environments wherein certain tasks are performed by remote processing devices that are linked through a communications network. However, some, if not all, aspects of the subject innovation may be practiced on stand-alone computers. In a distributed computing environment, program modules may be located in local or remote memory storage devices.

FIG. 1 is a block diagram of a networking environment 100 in which a system and method for determining a number of documents that are nearest to an approximate query may be implemented. The networking environment 100 includes one or more client(s) 102. The client(s) 102 can be hardware and/or software (e.g., threads, processes, or computing devices). The networking environment 100 also includes one or more server(s) 104. The server(s) 104 can be hardware and/or software (e.g., threads, processes, or computing devices). The servers 104 can house threads to perform search operations by employing the subject innovation, for example.

One possible communication between a client 102 and a server 104 can be in the form of a data packet adapted to be transmitted between two or more computer processes. The networking environment 100 includes a communication framework 108 that can be employed to facilitate communications between the client(s) 102 and the server(s) 104. The client(s) 102 are operably connected to one or more client data store(s) 110 that can be employed to store information local to the client(s) 102. The client data store(s) 110 may be stored in the client(s) 102, or may be located remotely, such as in a cloud server. Similarly, the server(s) 104 are operably connected to one or more server data store(s) 106 that can be employed to store information local to the servers 104.

FIG. 2 is a block diagram of a computing environment that may be used to implement a system and method for determining a number of documents that are nearest to an approximate query. The computing environment 200 includes a computer 202. The computer 202 includes a processing unit 204, a system memory 206, and a system bus 208. The system bus 208 couples system components including, but not limited to, the system memory 206 to the processing unit 204. The processing unit 204 can be any of various available processors. Dual microprocessors and other multiprocessor architectures also can be employed as the processing unit 204.

The system bus 208 can be any of several types of bus structures, including the memory bus or memory controller, a peripheral bus or external bus, or a local bus using any variety of available bus architectures known to those of ordinary skill in the art. The system memory 206 is computer-readable storage media that includes volatile memory 210 and non-volatile memory 212. The basic input/output system (BIOS), containing the basic routines to transfer information between elements within the computer 202, such as during start-up, is stored in non-volatile memory 212. By way of illustration, and not limitation, non-volatile memory 212 can include read-only memory (ROM), programmable ROM (PROM), electrically-programmable ROM (EPROM), electrically-erasable programmable ROM (EEPROM), or flash memory.

Volatile memory 210 includes random access memory (RAM), which acts as external cache memory. By way of illustration and not limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 202 also includes other computer-readable storage media, such as removable/non-removable, volatile/non-volatile computer storage media. FIG. 2 shows, for example, a disk storage 214. Disk storage 214 includes, but is not limited to, devices like a magnetic disk drive, floppy disk drive, tape drive, Jaz drive, Zip drive, LS-100 drive, flash memory card, or memory stick.

In addition, disk storage 214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 214 to the system bus 208, a removable or non-removable interface is typically used, such as interface 216.

It is to be appreciated that FIG. 2 describes software that acts as an intermediary between users and the basic computer resources described in the computing environment 200. Such software includes an operating system 218. The operating system 218, which can be stored on disk storage 214, acts to control and allocate resources of the computer 202.

System applications 220 take advantage of the management of resources by the operating system 218 through program modules 222 and program data 224 stored either in system memory 206 or on disk storage 214. It is to be appreciated that the claimed subject matter can be implemented with various operating systems or combinations of operating systems.

A user enters commands or information into the computer 202 through input devices 226. Input devices 226 include, but are not limited to, a pointing device (such as a mouse, trackball, stylus, or the like), a keyboard, a microphone, a gesture or touch input device, a voice input device, a joystick, a satellite dish, a scanner, a TV tuner card, a digital camera, a digital video camera, a web camera, or the like. The input devices 226 connect to the processing unit 204 through the system bus 208 via interface port(s) 228. Interface port(s) 228 include, for example, a serial port, a parallel port, a game port, and a universal serial bus (USB). Output device(s) 230 may also use the same types of ports as input device(s) 226. Thus, for example, a USB port may be used to provide input to the computer 202 and to output information from the computer 202 to an output device 230.

An output adapter 232 is provided to illustrate that there are some output devices 230 like monitors, speakers, and printers, among other output devices 230, which are accessible via the output adapters 232. The output adapters 232 include, by way of illustration and not limitation, video and sound cards that provide a means of connection between the output device 230 and the system bus 208. It can be noted that other devices and/or systems of devices provide both input and output capabilities, such as remote computer(s) 234.

The computer 202 can be a server hosting an event forecasting system in a networking environment, such as the networking environment 100, using logical connections to one or more remote computers, such as remote computer(s) 234. The remote computer(s) 234 may be client systems configured with web browsers, PC applications, mobile phone applications, and the like. The remote computer(s) 234 can be a personal computer, a server, a router, a network PC, a workstation, a microprocessor based appliance, a mobile phone, a peer device or other common network node and the like, and typically includes many or all of the elements described relative to the computer 202. For purposes of brevity, the remote computer(s) 234 is illustrated with a memory storage device 236. Remote computer(s) 234 is logically connected to the computer 202 through a network interface 238 and then physically connected via a communication connection 240.

Network interface 238 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 240 refers to the hardware/software employed to connect the network interface 238 to the system bus 208. While communication connection 240 is shown for illustrative clarity inside computer 202, it can also be external to the computer 202. The hardware/software for connection to the network interface 238 may include, for example, internal and external technologies such as mobile phone switches, modems including regular telephone grade modems, cable modems and DSL modems, ISDN adapters, and Ethernet cards.

Figure 3:
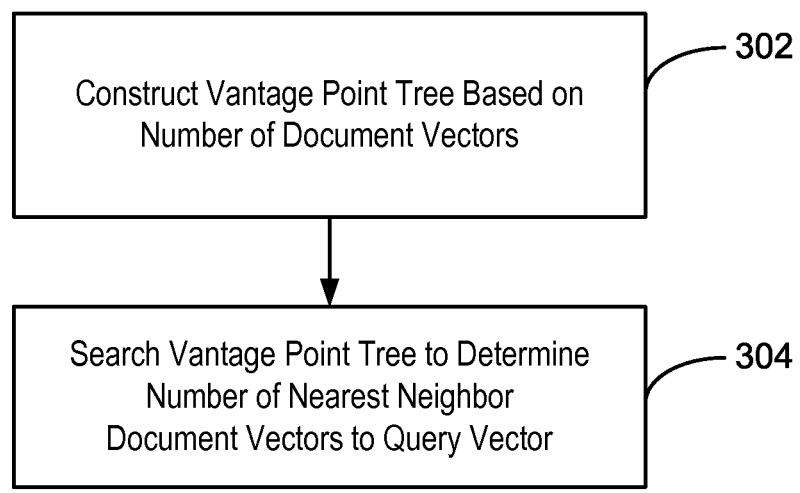
FIG. 3 is a process flow diagram of a method for determining a number of documents that are nearest to an approximate query.

FIG. 3 is a process flow diagram of a method 300 for determining documents that are nearest to an approximate query. The method 300 may be implemented within the networking environment 100 of FIG. 1 and/or the computing environment 200 of FIG. 2, for example. Further, the method 300 may be implemented by any suitable type of computing device that is capable of determining documents that approximately match a given query.

Figure 4:
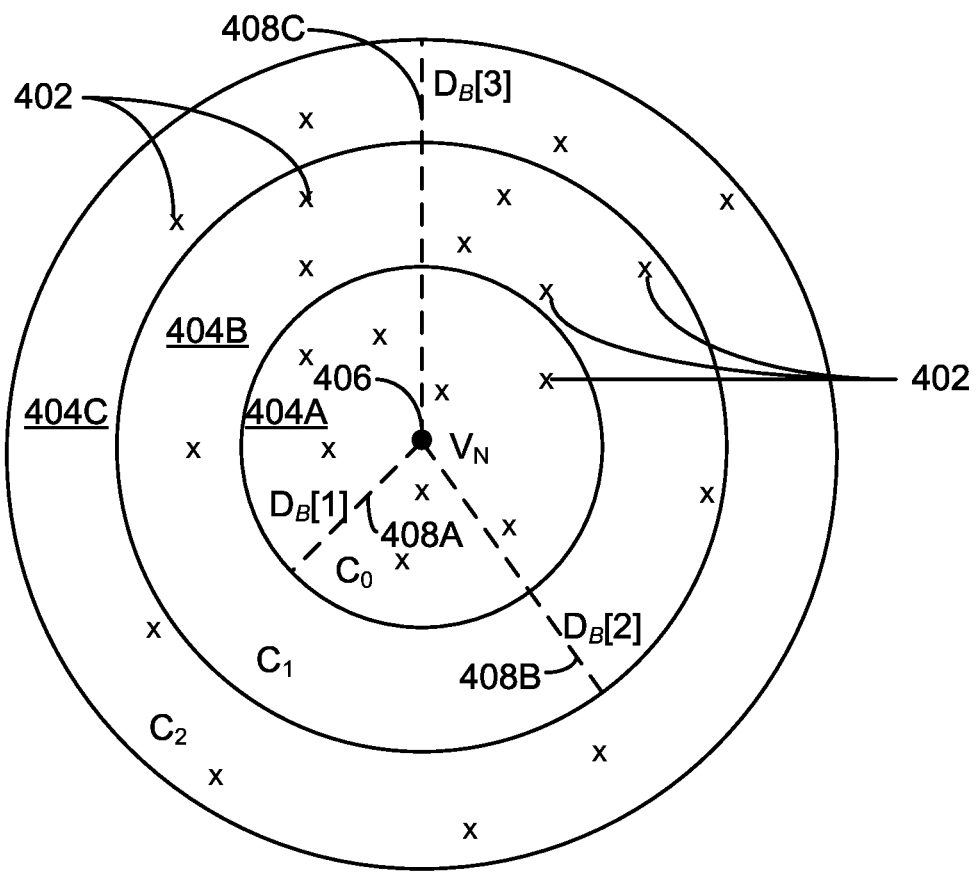
FIG. 4 is a schematic of a vantage point tree partition for a three-way split vantage point tree.

The method 300 begins at block 302, at which a vantage point tree is constructed based on a number of document vectors. During construction of the vantage point tree, one or more vantage points for each of a number of nodes in the vantage point tree are determined. If the vantage point tree includes more than one vantage point for any of the nodes, it may be referred to as a multi-vantage point tree. The one or more vantage points may be randomly-selected vectors from within a dataset corresponding to the document vectors. Alternatively, the one or more vantage points may be determined by calculating the centroid, i.e., the weighted average, of the dataset, and using the centroid as the vantage point. In various embodiments, child nodes for the vantage point tree are constructed by partitioning the document vectors into roughly equal sized clusters based on a distance of each document vector from the vantage point. For example, as shown in FIG. 4, the document vectors may be clustered into three roughly equal sized clusters, e.g., $C_0$, $C_1$, and $C_2$, by the distance of each document vector to the vantage point. Each cluster may form a new node in the vantage point tree.

A vantage point tree is constructed by repeatedly partitioning vantage point tree nodes using one vantage point per node in a recursive fashion until there are a desired number of document vectors in the leaf node. Similarly, a multi-vantage point tree is constructed by repeatedly partitioning a multi-vantage point tree node using multiple vantage points in a recursive fashion until there are a desired number of document vectors in the leaf nodes. A multi-vantage point tree may be viewed as a vantage point tree in which a certain number of initial levels of a sub-tree emanating from a node share the same vantage point.

At block 304, the vantage point tree is searched to determine a number of nearest neighbor document vectors to a given query vector. In various embodiments, determining the number of nearest neighbor document vectors includes traversing the vantage point tree to find a specified number of the documents vectors that are nearest to, or most closely match, the query vector. This is accomplished by removing a portion of the document vectors from the dataset based on the one or more vantage points for each of the nodes in the vantage point tree and a specified search radius centered about the query vector. More specifically, the query vector starts at the root node in a vantage point tree. At a given node in the vantage point tree, any document clusters that do not intersect the hypersphere of the specified search radius centered about the query vector are not considered, and the search does not traverse the child nodes corresponding to those document clusters. The search recursively proceeds in nodes that correspond to document clusters that do intersect the hypersphere of the specified search radius centered about the query vector until leaf nodes are reached.

In addition, any document vectors that do not satisfy the triangle inequality condition with respect to any of the vantage points in the tree path may also be removed. Removing a document vector that does not satisfy the triangle inequality condition may include calculating a first distance range between the query vector and the vantage point, calculating a second distance range between the document vector and a vantage point, determining whether an absolute value of a difference between the first distance range and the second distance range is greater than the specified search radius, and, if the absolute value is greater than the specified search radius, removing the document vector from the vantage point tree. In various embodiments, the distance between the document vector and the vantage points in the vantage point tree may be pre-computed and stored so that they do not need to be recomputed at query time. Further, in various embodiments, any clusters within the vantage point tree that are outside the specified search radius for the query vector may also be removed.

Once the documents that are outside the specified search radius or do not satisfy the triangle inequality condition have been removed, a distance between each remaining document vector and the query vector may be calculated, and the specified number of nearest neighbor document vectors to the query vector may be determined by sorting the distances between each remaining document vector and the query vector. Further, in some embodiments, the specified search radius may be adjusted such that only the specified number of nearest neighbor document vectors are remaining after document vectors that are outside of the specified search radius and document vectors that do not satisfy the triangle inequality condition have been removed from the vantage point tree.

The process flow diagram of FIG. 3 is not intended to indicate that the blocks of the method 300 are to be executed in any particular order, or that all of the blocks are to be included in every case. Further, any number of additional blocks not shown in FIG. 3 may be included within the method 300, depending on the details of the specific implementation. For example, in some embodiments, the documents corresponding to the nearest neighbor document vectors are ranked based on a relevance of each document to the query corresponding to the query vector.

Further, in some embodiments, the method 300 is implemented by a distributed computing system including a number of individual computing devices. According to such embodiments, a vantage point tree may be constructed in a distributed computing environment. For a given vantage point tree node in the vantage point tree, multiple machines may encompass all the data corresponding to the document cluster of a given node. One machine among this set of multiple machines can be chosen to be the coordinator for further splitting the data in this document cluster. This coordinating machine may choose a vantage point to further split the data, for example, by randomly choosing a point among the set of documents in the document cluster. Then, all the multiple machines corresponding to the documents in the document cluster may compute distances from the documents on the machine to the vantage point. After this, the distances may be sorted, and the document cluster can be further subdivided by subdividing the multiple machines to create the child nodes to the given vantage point tree node. Once all the documents corresponding to a given document cluster reside on one machine, standard vantage point tree building techniques can be used to create lower levels of the tree.

According to such embodiments, nearest neighbor search to a query vector may be performed in the distributed computing environment by starting at the root node. When the search is at a given node in the vantage point tree corresponding to a document cluster that encompasses multiple machines, the query vector is sent to a coordinating computing device randomly chosen from the multiple computing devices within the set of machines corresponding to the document cluster. The system memory of the coordinating computing device may be configured to determine which document clusters in the child nodes intersect the hypersphere of a specified search radius centered about the query vector. It should be noted that the document clusters of the child nodes are sub-clusters of the given document cluster. The search then proceeds by randomly choosing a machine in the set of machines corresponding to the child nodes which have intersecting document clusters until all the document clusters corresponding to the child nodes reside on a single machine. At the point when all document clusters corresponding to the child nodes reside on a single machine, standard vantage point tree search can proceed on lower levels of the tree until leaf nodes are reached. Each machine in the distributed computing system which has document clusters corresponding to leaf nodes reached by the search can further traverse the set of document vectors according to the triangle inequality condition. The system memory of each computing device within the distributed computing system may be configured to determine distances between the query vector and each document vector stored on the computing device. The system memory of each computing device may also be configured to send the distances to the coordinating computing device, send the document vectors which are within some specified search radius to the query vector to the coordinating computing device. The system memory of each computing device may further be configured to determine a specified number of nearest neighbor document vectors to the query vector based on the distance between each remaining document vector and the query vector, and send the specified number of nearest neighbor document vectors to the coordinating device. Once the information reaches the coordinating device corresponding to the root node in the vantage point tree, the documents within the specified search radius may be returned to the user. In other embodiments, a certain number of vectors with minimal distance to the query vector may be returned.

According to embodiments described herein, each document within a database of documents may include some set of vectors, and each vector may include any of the information contained in a document, text used to describe a document, an image within the document from which SIFT or other features can be extracted, the geo-location of a document, or any combinations thereof. If the information is assumed to be constrained to numerical information, the term D may denote the set of all documents in the database, and the term N may denote the number of documents in the database, i.e., $N=|D|$. In addition, the term $D_i \in D$ may denote the i-th document in the database, where $i=0, \ldots, N-1$. The term $V_j(D_i)$ may denote the j-th vector of the i-th document, where $j=0, \ldots, M_i-1$, and where $M_i$ is the number of vectors for the i-th document. The term Q may denote the query document. The term $V_j(Q)$ may denote the j-th vector of the query document, and the term $d(Q, D_i)$ may denote the distance (or pseudo-distance) function between a query document and the i-th database document.

Given a query, Q, it may be desirable to find all documents that are within some distance (or pseudo-distance), R, of the query document. The query function q may be as shown below in Eq. (1).

$$q(Q,D_i)=\{D \in D | d(Q,D) \leq R\} \qquad (1)$$

An alternative formulation is to sort all documents in the dataset by distance and return the C closest documents.

According to one technique for finding the closest documents, each vector in the query document and in the database document is assigned a "word," which is formed by quantization. That is, the term $W_j(Q)$ may be defined as the j-th word in the query document corresponding to the j-th vector, and similarly, the term $W_j(D_i)$ may be defined as the j-th word in database document i. The bag-of-words (BOW) for each document can be found via quantization as shown below in Eqs. (2) and (3).

$$W_j(Q)=\arg\min_{S \in S_j} \|S-V_j(Q)\| \qquad (2)$$

$$W_j(D_i)=\arg\min_{S \in S_j} \|S-V_j(D_i)\| \qquad (3)$$

In Eqs. (2) and (3), S is a set of codebook vectors, e.g., a "word dictionary." The visual word corresponding to a given vector is the closest vector in the word dictionary (typically closest in the $l^2$-norm sense).

The set $W_Q=\{W_i(Q), i=0, \ldots, M-1\}$ may be defined as the BOW corresponding to the query document, and similarly, the term $W_D$ may be defined as the corresponding BOW for the document. The distance between the query document and the database document (which is actually a pseudo-distance since it is not a true metric) is given by $d(Q,D)=1-J(W_Q,W_D)$, where $J(X,Y)$ is the Jacard similarity between two sets, or can be the histogram intersection between two sets. The histogram intersection between two sets can be found using Eq. (4). According to Eq. (4), the term $H(Q,j)=\|\{w \in W_Q | w=j\}\|$ may be defined as the number of times word j occurs in the query document. Similarly, the term $H(D,j)$ may be defined as the number of times word j occurs in the dataset document.

$$d(Q,D)=\Sigma_{j=1}^{\|S\|}\min(H(Q,j),H(D,j)) \qquad (4)$$

Eq. (4) may represent a count of the number of words that are common between Q and D. An example is shown in Table 1, in which a reverse index that contains the number of times a particular word exists in a document is stored.

TABLE 1

Reverse index table showing the number of times a given word occurs in a document.

|       |    | Documents |    |    |    |    |    |    |       |
|-------|----|----|----|----|----|----|----|----|-------|
|       |    | D0 | D1 | D2 | D3 | D4 | D5 | D6 | Query |
| Words | W0 | 0  | 0  | 1  | 2  | 0  | 0  | 1  | 2     |
|       | W1 | 1  | 2  | 1  | 0  | 0  | 1  | 0  | 1     |
|       | W2 | 0  | 3  | 0  | 0  | 2  | 0  | 0  | 0     |
|       | W3 | 0  | 0  | 1  | 1  | 0  | 0  | 0  | 3     |
| d(Q, D) |  | 1  | 1  | 3  | 3  | 0  | 1  | 1  | —     |

Other technqiues are also often used to convert feature vectors into compact representations or compact binary representations. For example, locality sensitive hashing (LSH) converts each feature vector into a binary bit-vector hash by employing random projections, followed by quantization and hashing of the quantized values into a binary bit vector.

Therefore, there are at least two methods for controlling the number of documents returned by a query. The first method involves controlling the quantization size. For example, if it is desirable to have a larger number of documents returned, the quantization size can simply be increased by using a smaller word dictionary. As a result, there will be a higher probability that two vectors will map to the same word, and more documents will be retrieved. Similarly, if the word dictionary size is larger, e.g., via smaller quantization steps, then the probability of matching is lower, and lower histogram intersection values will be returned. The second technique involves controlling the threshold to define a match. For example, if the threshold for histogram intersection used to define a match is lowered, a higher number of results will be returned. Similarly, if the threshold for histogram intersection is increased, a lower number of results will be returned.

In exact text matching, the only method that can be used to control the number of results returned from a query is to control the threshold for histogram intersection used to define a match. That is, there is no quantization in exact text matching. However, for approximate matching of feature vectors, the number of results returned from a query may be controlled by controlling the quantization size. For example, in the example shown in Table 1, if a threshold of 3 is used to define a match, then only documents D2 and D3 match the query. If the threshold is descreased to 2, then still only D2 and D3 match. However, if the threshold is decreased to 1, then D0, D1, D2, D3, D5, and D6 all match. This resolution of matching may or may not be appropriate. For example, there is no way to find the nearest four documents. Rather, only the nearest two documents or nearest six documents may be found.

As an alternative, if the word dictionary is large, then a much finer resolution of histogram intersection results may be achieved. However, if the word dictionary is small, there may not be any matches, as most vectors would not match. Therefore, all the histogram intersections may be zero.

Thus, the performance of an approximate match using a BOW model is dependent on the size and method used to create the initial word dictionary, and the achievable performance is essentially fixed once those factors have been determined. An additional issue that the BOW method suffers from is that, in cases of small dictionary sizes, e.g., large quantization cells, query vectors near the boundaries typically have nearest neighbors that are actually in adjacent cells as opposed to within the cell. Further, even hash based methods essentially have a fixed predefined quantization once the quantization and hashing method is determined.

To solve the issue of boundary vectors suffering from inaccurate results, several techniques have been proposed. Some techniques involve the use of overlapping cells, so that a single vector gets assigned to multiple cells. This allows boundary vectors to obtain improved results, as the probability that the vector will be on the boundary of all the assigned cells is smaller. Other techniques involve considering neighboring cells. However, in high dimensions, almost all cells will be neighbors, as the number of neighbors grows exponentially with dimension.

In addition, to solve the issue of not being able to control the quantization size during query, the use of hamming embedding has been proposed. This allows for the use of large cells with additional binary information embedded per vector to determine the position of the vector within the cell. Once a vector is localized to a cell, hamming distances are computed via XOR to find the true nearest neighbors. A threshold can be used to control the number of nearest neighboring vectors.

However, in order to directly use nearest neighbor matching, a metric has to be used to combine the results from nearest neighbor matching from multiple vectors into a single result (as the histogram intersection does for the BOW model). In addition, the nearest neighbor problem itself involves high computation as distance computations have to be done between the query document vector and all vectors in the database documents.

As an alternative, it may be desirable to find methods for directly finding documents closest to a query document. For example, one method involves directly using the Euclidean distance between the documents, as shown below in Eq. (5).

$$d(Q,D)=\Sigma_{j=0}^{M-1}\|V_j(Q)-V_j(D)\|^2 \qquad (5)$$

Therefore, all M vectors of the documents may be concatenated, and the $l^2$-norm may be directly taken. However, the vectors may not be in the same order for all the documents. For example, one document may be a rotated version of another.

An improved method may involve allowing for permutation of the vectors to minimize the distance. For example, the distance may be defined as shown below in Eq. (6).

$$d(Q,D)=\Sigma_{j=0}^{M-1}\|V_j(Q)-V_{c(j)}(D)\|^2 \qquad (6)$$

In Eq. (6), $V_{c(j)}$ is the "closest" vector to vector j. However since it does not make sense to reuse vectors, c(j) is a one-to-one, i.e. invertible, bijection, mapping. One way to define c(j) is as a permutation of 0, . . . , M−1 as shown below in Eq. (7), which minimizes the total distortion.

$$\{c(j), j=0, \ldots, M-1\} = \arg\min_{d \in P} \Sigma_{j=0}^{M-1} \|V_j(Q) - V_{d(j)}(D)\|^2 \quad (7)$$

In Eq. (7), d=d(j),j=0, . . . ,M−1 is a given mapping over all possible mappings, P.

Depending on the number of vectors, searching over all permutations may be infeasible. For example, M vectors will have M! permutations. A greedy method may be used instead to speed up the search. For example, the set of available vectors may first be initialized as $V_D(0)=V_i(D)$, i=0, . . . , M−1. Then, the term $V_{c(0)}(D)$ may be determined according to Eq. (8).

$$V_{c(0)}(D) = \arg\min\ S \in V_D(0) \|V_0(Q) - S\|^2 \quad (8)$$

In Eq. (8), c(0) is the corresponding index. The term $V_D(1) = V_D(0) \backslash V_{c(0)}(D)$ may be defined to remove $V_{c(0)}(D)$ from the set. The term $V_{c(1)}(D)$ may then be determined according to Eq. (9).

$$V_{c(1)}(D) = \arg\min\ S \in V_D(1) \|V_1(Q) - S\|^2 \quad (9)$$

In Eq. (9), c(1) is the corresponding index. In general, $V_D(i+1) = V_D(i) \backslash V_{c(i)}(D)$.

The above methods of permutation followed by Euclidean distance computation may have some issues. Specifically, in many cases, it may be desirable to define the pseudo-distance as the negative of the number of similar vectors (as is done when using histogram intersections or Jacard similarity). For example, a pair of documents having ten vectors within a Euclidean distance of two of each other, e.g., total Euclidean distance of twenty, may be more similar to each other than a pair of documents having five vectors identical and five vectors with distance of three, e.g., total Euclidean distance of fifteen. This may be the case, for example, if vectors with distance less than or equal to two are defined as "matching," and vectors with distance greater than two are defined as "non-matching."

To solve this, non-linear mappings may be introduced into the Euclidean distance to make it a pseudo-distance. For example, d(Q,D) may be defined as shown below in Eq. (10).

$$d(Q,D) = \Sigma_{j=0}^{M-1} g_j(\|V_j(Q) - V_{c(j)}(D)\|^2) \quad (10)$$

According to Eq. (10), $g_j$ is a non-linear mapping. One such mapping may be as shown below in Eq. (11).

$$d(Q, D) = \sum_{j=0}^{M-1} \begin{cases} N_i, & \text{if } \|V_j(Q) - V_{c(j)}(D)\| \le R_j \\ P_i, & \text{if } \|V_j(Q) - V_{c(j)}(D)\| > R_j \end{cases} \quad (11)$$

In other words, a negative weight, e.g., smaller distance, may be given to vectors with a distance that is within some threshold, $R_j$, and a positive weight may be given to vectors with a distance that is larger than the threshold.

A more specific implementation would be if $N_i=0$ and $P_i=1$. In this case, finding documents with low pseudo-distance, d, would be the same as finding those that maximize a score, s(Q,D), which is defined below in Eq. (12).

$$s(Q, D) = \sum_{j=0}^{M-1} \begin{cases} 1, & \text{if } \|V_j(Q) - V_{c(j)}(D)\| \le R_j \\ 0, & \text{if } \|V_j(Q) - V_{c(j)}(D)\| > R_j \end{cases} \quad (12)$$

Documents having no matching vectors with the query document will obviously have a score of zero. In order to determine the score for documents with at least one matching vector, the bijective mapping c(j) may be determined.

The term $V_T$ may be defined as the set that is the concatenation of all vectors in the document dataset, i.e., $V_T \cup_i \cup_j V_j(D_i)$. For each vector, $V_j(Q)$, suppose there is a good techniques for finding all the vectors in $V_T$ that are within $R_j$ distance. That is, $M(V_j(Q)) = \{V_k(D_i) | \|V_j(Q) - V_k(D_i)\| \le R_j\}$, k=0, . . . , M−1, i=0, . . . , N−1 can be found. Given this information, Table 2 can be created for all the documents that have at least one matching vector, where an entry of 1 indicates that the vectors are within $R_j$ of each other.

TABLE 2

Indicators showing which vectors are "close" between query document and database document.

|  | $V_0(D)$ | $V_1(D)$ | $V_{M-1}(D)$ |
|---|---|---|---|
| $V_0(Q)$ | 1 | 0 | 1 |
| $V_1(Q)$ | 0 | 1 | 0 |
| $V_{M-1}(Q)$ | 1 | 0 | 0 |

However, since each vector in the query document can be mapped with only a single vector in the database document, a bijection, $\{c(j), j=0, \ldots, M-1\}$, may be found to maximize the score. Suppose that Table 2 can be thought of as a matrix, where $S_{i,j}=1$ if $\|V_i(Q) - V_j(D)\| \le R_i$. It is desirable to find a permutation matrix, P, such that tr(PS) is maximized, where tr(.) is the trace operator. This matrix may be the score. However, since the permutation matrix has M! possibilities, this is a fairly difficult combinatorial problem.

The permutation matrix may be found via a greedy technique similar to "Cuckoo Hashing." For a given document, a vector of dimension M is created, where the vector indicates which query vector is being mapped to a given document vector. Let this vector be $u=[u_0 u_1 \ldots u_{M-1}]$, where each $u_i$ is initialized to −1. The following procedure may be followed to assign the mapping and, thus, obtain the permutation matrix. The following series of mapping operations is applied for each query vector i=0, . . . , M−1. For this operation, a vector $k=[k_0 k_1 \ldots k_{M-1}]$ is defined, where $k_i$ indicates whether vector i has been examined for mapping in the current cycle. All $k_i$ are set to zero to indicate they have not been mapped. Let m be the vector being considered for mapping. The term m=i may be set, and the term $k_m=1$ may be set. For vector m in the query document, the first j where $S_{i,j}=1$ and $u_j=-1$ may be attempted to be found. If such a j is found, then the term c(i)=j may be set, and the term $u_j=i$ may be set. The term i may then be incremented, and the procedure may be repeated from the beginning. If no such j is found, the first j where $S_{i,j}=1$, but $u_j \ne 1$, and $k_{u_j}=0$ may be found. The term c(i)=j may be set, and the value of $u_j=i$ may be updated. The mapping operation for the former value of $i'=u_j$ may then be repeated. That is, vector i essentially kicks out $i'=u_j$ from mapping to j and takes over that mapping. Vector then has to find a new place to which to be mapped. The term $m=u_j$ may be set, and the procedure may be repeated starting at the setting of the term $k_m=1$. If no j is found where $S_{i,j}=1$ or if the only j where $S_{i,j}=1$ is one with $u_j \ne 1$ and $k_{u_j}=1$, then the term i may be incremented, and the procedure may be repeated from the beginning.

TABLE 3

Mapping algorithm.

| | $V_0(D)$ | $V_1(D)$ | $V_2(D)$ |
|---|---|---|---|
| $V_0(Q)$ | 1 | 0 | 1 |
| $V_1(Q)$ | 1 | 1 | 0 |
| $V_2(Q)$ | 1 | 0 | 0 |

As an example, consider Table 3. In this example, three vectors in the query document map with three vectors in the database document. The following steps may be performed. First, let c(0)=0 and $u_0$=0, since $S_{0,0}$=1 and $u_0$=−1. Second, let c(1)=1 and $u_1$=1, since $S_{1,1}$=1 and $u_1$=−1. Third, let c(2)=0 and $u_0$=2, since $s_{2,0}$=1 and former i'=$u_0$=0. Fourth, perform remaping of m=0, and let c(0)=2 and $u_2$=0 since $S_{0,2}$=1 and $u_2$=−1. After this mapping, c(0)=2, c(1)=1, and c(2)=0 is obtained, which gives the permutation matrix shown below in Eq. (13).

$$P = \begin{bmatrix} 0 & 0 & 1 \\ 0 & 1 & 0 \\ 1 & 0 & 0 \end{bmatrix} \quad (13)$$

Since there are at most M mappings per each iteration, and there are M iterations with each mapping being O(M), the complexity of this algorithm is at most $M^3$, which is polynomial in time. However, the complexity is typically much lower.

The method of using a bijective mapping and then using a score function defined above is similar to a histogram intersection in the BOW model. For example, if the query document only has a given word A times whereas the database document has B occurrences, the histogram intersection would only assign a score of min(A,B). Similarly, this method prevents a single vector in a given document that is close to multiple vectors in another document from being allowed to count as a "match" for all the close vectors. Instead, the vector only gets mapped to a single close vector. Therefore, this method allows for quickly combining results from nearest neighbor searches for individual vectors in a document into a single score.

In addition to finding similar documents, it may be desirable to find nearest neighboring vectors. The nearest neighbor is now defined as true distance metric with several properties, including d(x,y)≥0, d(x,y)=0 iff x=y, d(x,y)=d(y, x), and d(x,z)≤d(x,y)+d(y,z). This problem is a subproblem of finding similar documents. Although the final distance in finding similar documents may be a pseudo-distance, it has a nearest neighbor problem as a sub-problem.

In the BOW model, finding the word involves finding the nearest neighbor in the word dictionary using the $l^2$-norm, for example. Although this complexity is not typically too high, it grows linearly with the word dictionary size. Text matching does not suffer from this issue because no quantization is involved.

In order to find similar documents by directly computing the nearest neighbors, all vectors in the document database that are near the query document vectors in the $l^2$-norm may be found. However, the complexity of finding all the nearest neighbors for a given query document vector, $V_j(Q)$, may be very high, since it involves computing distances between the document vectors. The complexity grows as the size of the total document vector set, $V_T$, grows. For example, if the document vector set is the set of all SIFT vectors from all images on the web, then this complexity may be prohibitively high.

Embodiments described herein provide techniques for significantly speeding up and improving the search complexity for nearest neighbor problems, both in an exact setting and an approximate one. Although primarily designed to improve cases in which the nearest neighbors are being directly found over a large dataset, such techniques can also be used to improve the feature vector to word computation in a BOW setting.

One technique that can be used to reduce the complexity of nearest neighbor search and improve efficiency over linear search over the entire vector set involves the use of vantage point (VP) trees or multi-vantage point (MVP) trees. In a vantage point tree, the set of documents is partitioned into clusters by using their distance to vantage points in order to partition the data.

FIG. 4 is a schematic of a vantage point tree partition 400 for a three-way split vantage point tree. Document vectors 402 are partitioned into three clusters 404A, 404B, and 404C by their distance to a vantage point, $v_N$, 406, wherein the vantage point 406 itself may be chosen from the set of vectors 402. Distance boundaries $D_B[i]$ 408A-C are shown, where $D_B[0]$ is 0. Specifically, distance boundary $D_B[1]$ 408A corresponds to the first cluster 404A, distance boundary $D_B[2]$ 408B corresponds to the second cluster 404B, and distance boundary $D_B[3]$ 408C corresponds to the third cluster 404C.

Suppose the set of vectors in a given node are given by N. In an $n_S$-way vantage point tree, the data is partitioned into $n_S$ child nodes by their distance from the given vantage point vector $V_N$. Let $D_B[i]$, i=0, ..., $n_S$ be the distance boundaries used to partition the data. Let $C_i$, i=0, ..., $n_S$−1 be the vectors in the $n_S$ child nodes of node N. Eq. (14) may then be obtained.

$$C_i = \{v \in N | D_B[i] \leq \|v - v_N\| < D_B[i+1]\} \quad (14)$$

If the data is to be partitioned evenly among the child nodes, $D_B[i]$ may be defined as the $$\frac{i}{n_S}$$

fraction of the distribution of distances from the vantage point, $v_N$. This results in $D_B[0]$=0.

Figure 5:
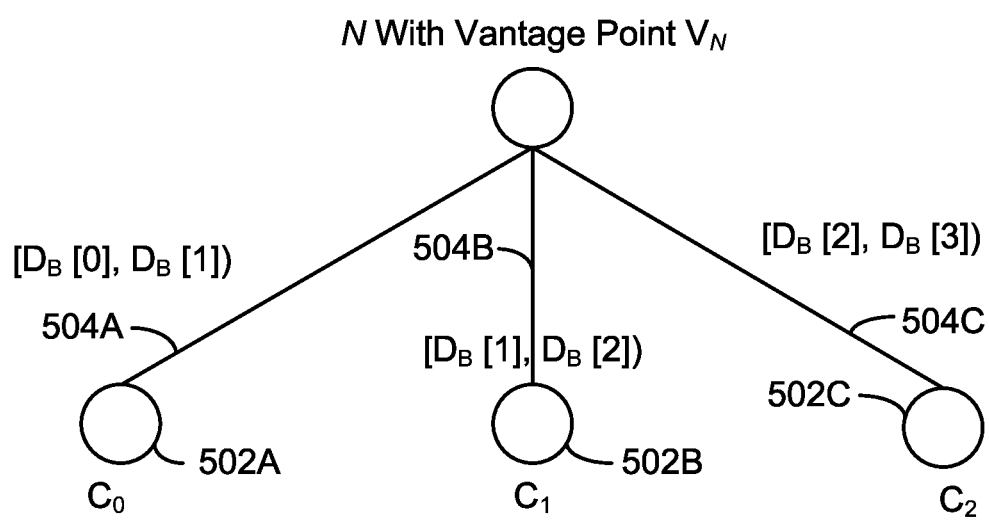
FIG. 5 is a schematic of a three-way split vantage point tree corresponding to the vantage point tree partition of FIG. 4.

FIG. 5 is a schematic of a three-way split vantage point tree 500 corresponding to the vantage point tree partition 400 of FIG. 4. A first child node 502A, $C_0$, for the first cluster 404A may be written as $C_0 = \{v \in N | D_B[0] \leq \|v - v_N\| \leq D_B[1]\}$. A second child node 502B, $C_1$, for the second cluster 404B may be written as $C_1 = \{v \in N | D_B[1] \leq \|v - v_N\| < D_B[2]\}$. A third child node, $C_2$, 502C for the third cluster 404C may be written as $C_2 = \{v \in N | D_B[2] \leq \|v - v_N\| < D_B[3]\}$.

The distance boundaries used to obtain the child nodes 502A-C are shown in FIG. 5 on the edges 504A-C of the three-way split vantage point tree 500. Specifically, the distance boundary $[D_B[0], D_B[1])$ is used to obtain the first child node 502A. The distance boundary $[D_B[1], D_B[2])$ is used to obtain the second child node 502B. The distance boundary $[D_B[2], D_B[3])$ is used to obtain the third child node 502C.

Figure 6:
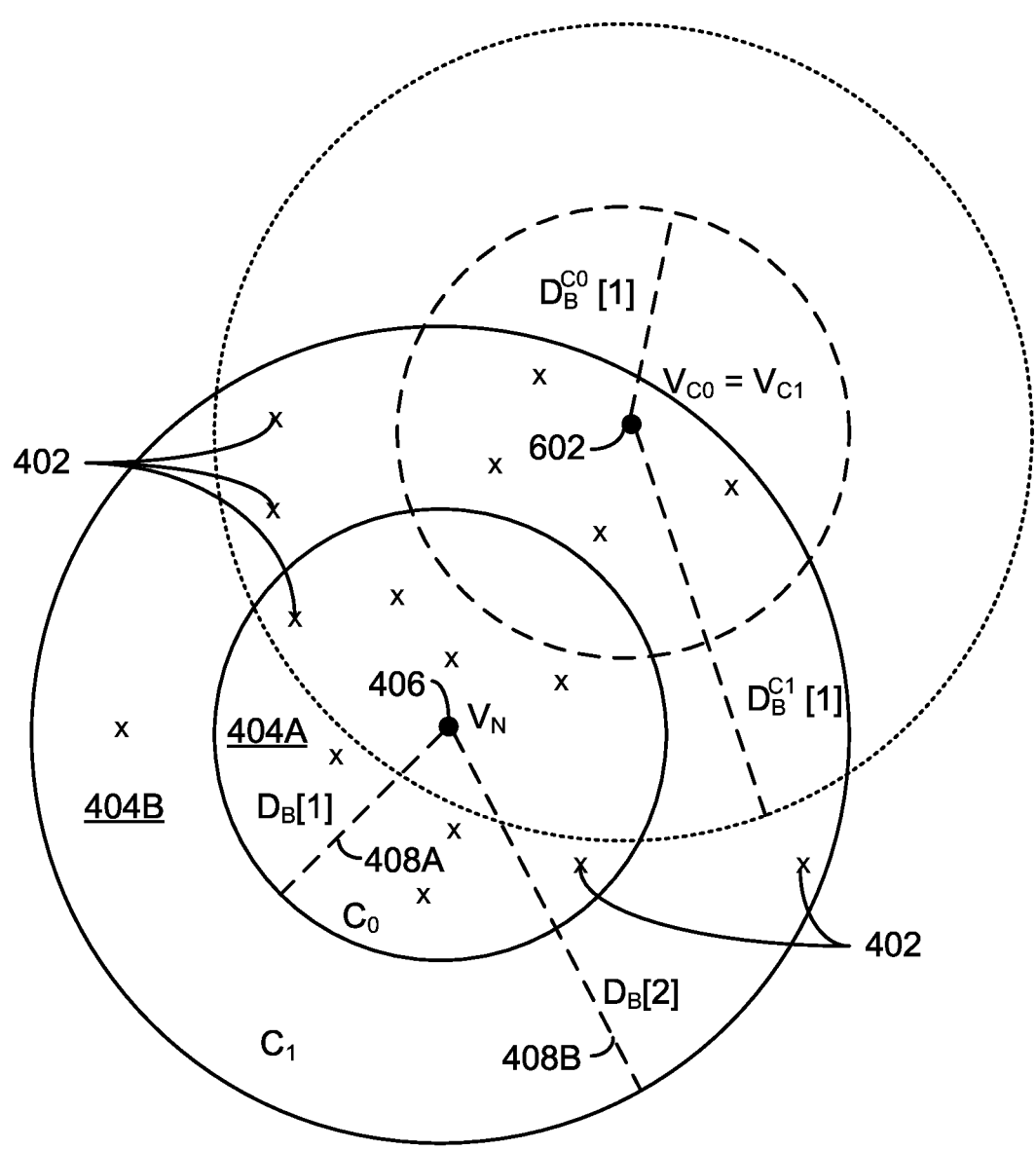
FIG. 6 is a schematic of a multi-vantage point tree partition for a two-way split multi-vantage point tree.

FIG. 6 is a schematic of a multi-vantage point tree partition 600 for a two-way split multi-vantage point tree. Like numbered items are as described with respect to FIG. 4. According to the embodiment shown in FIG. 6, the two-way split multi-vantage point tree has two vantage points, vantage point $v_N$ 406 and vantage point $v_{C0}=v_{C1}$ 602. The vantage point $v_{C0}=v_{C1}$ 602 is used to partition the first cluster 404A and the second cluster 404B resulting from the vantage point tree partition 400 of FIG. 4. For simplicity, $D_B^{C0}[2]$ and $D_B^{C1}[2]$ are not shown in FIG. 6.

In a $n_S$-way split multi-vantage point (MVP) tree with $n_V$ vantage points, $n_V$ consecutive levels of the tree from a given node use the same vantage point. The multi-vantage point tree partition 600 may split the data evenly into four clusters, or partitions, as discussed with respect to FIG. 7. In an MVP tree, a single cluster of data from an MVP node is partitioned into $n_S^{n_V}$ MVP nodes and clusters.

Figure 7:
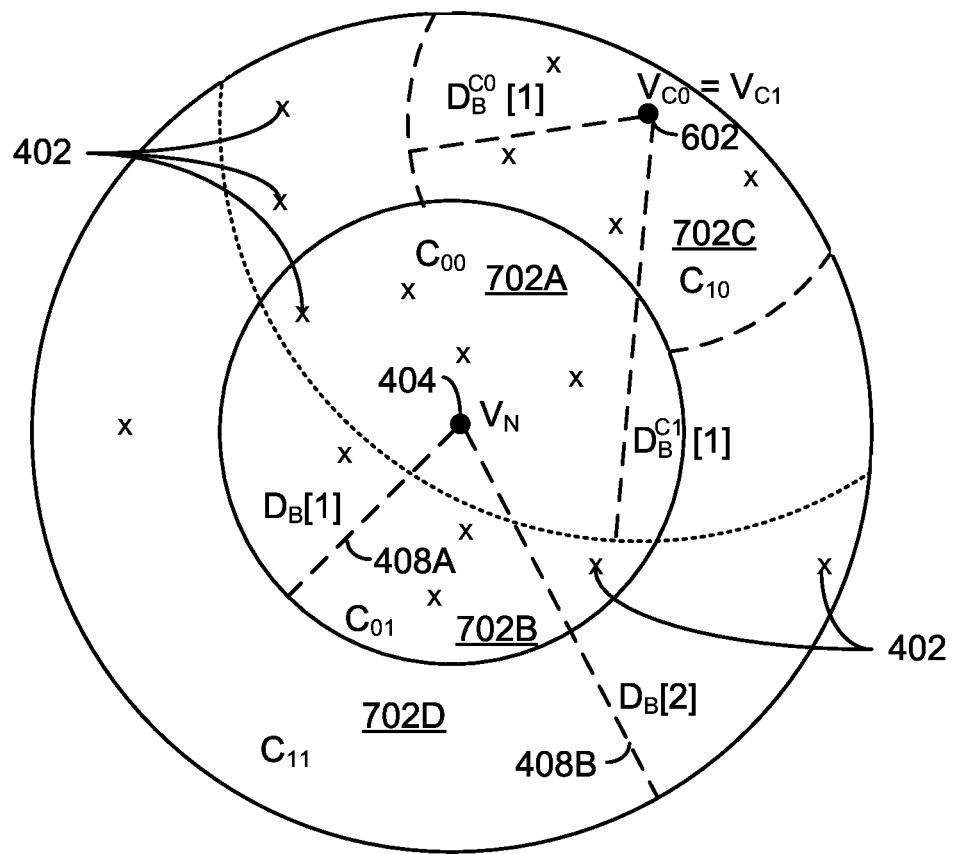
FIG. 7 is a schematic of a portion of the multi-vantage point tree partition of FIG. 6 showing how the document vectors are evenly split into four clusters.

FIG. 7 is a schematic of a portion 700 of the multi-vantage point tree partition 600 of FIG. 6 showing how the document vectors 402 are evenly split into four clusters 702A-D. Like numbered items are as described with respect to FIGS. 4 and 6. Each cluster 702A-D includes four document vectors 402.

Figure 8:
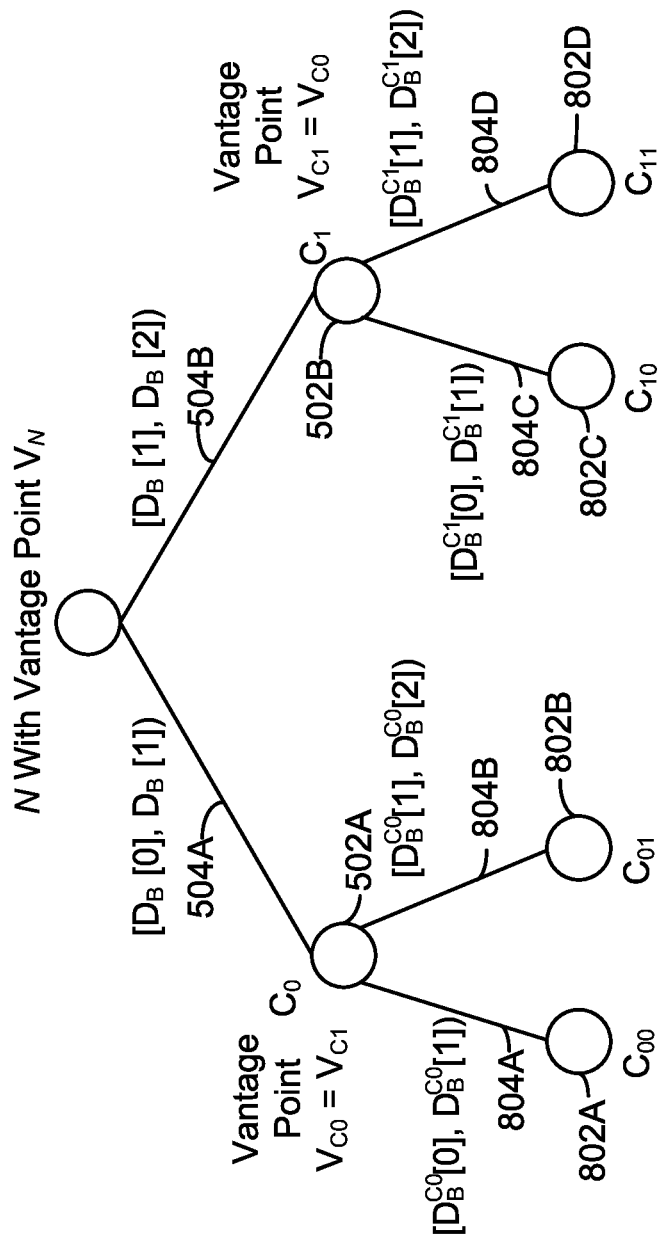
FIG. 8 is a schematic of a two-way split multi-vantage point tree corresponding to the multi-vantage point tree partition of FIG. 6.

FIG. 8 is a schematic of a two-way split multi-vantage point tree 800 corresponding to the multi-vantage point tree partition 600 of FIG. 6. Like numbered items are as described with respect to FIG. 5. As shown in FIG. 8, the first child node 502A, $C_0$ is further split into two child nodes, $C_{00}$ and $C_{01}$, 802A and 802B. The second child node 502B, $C_1$, is also split into two child nodes, $C_{10}$ and $C_{11}$, 802C and 802D. Each child node 802A-D may represent four document vectors 400, as discussed with respect to FIG. 7.

The distance boundaries used to obtain the child nodes 802A-D are shown in FIG. 8 on the edges 804A-D of the two-way split multi-vantage point tree 800. Specifically, the distance boundary $[D_B^{C0}[0], D_B^{C0}[1])$ is used to obtain one child node 802A branching off the first child node 502A, while the distance boundary $[D_B^{C1}[1], D_B^{C1}[2])$ is used to obtain the other child node 802B branching off the first child node 502A. Similarly, the distance boundary $[D_B^{C1}[0], D_B^{C1}[1])$ is used to obtain one child node 802C branching off the second child node 502B, while the distance boundary $[D_B^{C1}[1], D_B^{C1}[2])$ is used to obtain the other child node 802D branching off the second child node 502B.

In both VP and MVP trees, partitioning is recursively continued on each cluster and corresponding node in the tree until there are $n_L$ vectors in the leaf nodes, where $n_L$ is some pre-determined amount. Note that larger $n_L$ trees can be formed by simply traversing the bottom branches of the tree.

Once a query vector $V_Q$ is given with radius R that reaches a given node with N vectors, the search space may be further traversed by determining whether the ball with radius R centered at $v_Q$ intersects the partitioned regions containing vectors $C_i$. If there is no intersection, all the database document vectors in those clusters may be discarded. The condition for intersection is shown below in Eq. (15).

$$\min(d(v_Q,v_N)+R, D_B[i+1]) > \max(d(v_Q,v_N)-R, D_B[i]) \quad (15)$$

In addition, if the distances between the vantage point vector, $v_N$, and all the database document vectors, $v_Q$, are stored, documents vectors that violate the triangle inequality can be removed. The triangle inequality states that the conditions shown below in Eqs. (16)-(18) are to be met.

$$d(v_Q, v_N) \leq d(v_Q, v_D) + d(v_D, v_N) \quad (16)$$

$$d(v_Q, v_D) \leq d(v_Q, v_N) + d(v_N, v_D) \quad (17)$$

$$d(v_D, v_N) \leq d(v_D, v_Q) + d(v_Q, v_N) \quad (18)$$

Thus, Eq. (19) may be obtained.

$$d(v_Q, v_D) \geq (d(v_Q, v_N) - d(v_D, v_N)) \quad (19)$$

Eq. (20) may then be obtained.

$$\text{abs}(d(v_Q, v_N) - d(v_D, v_N)) > R \quad (20)$$

Accordingly, $d(v_Q, v_D) > R$, and $v_D$ can be removed as a possible nearest neighbor.

Figure 9:
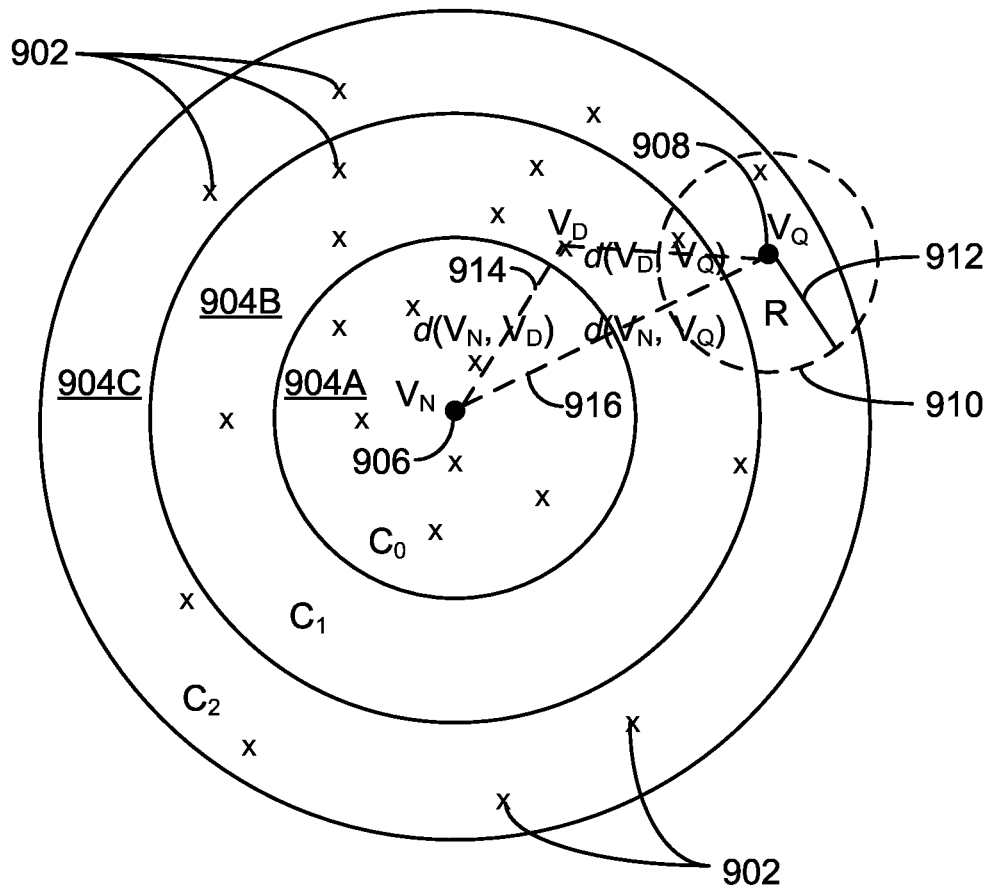
FIG. 9 is a schematic showing techniques for traversing the search space for a three-way split vantage point tree partition.

FIG. 9 is a schematic showing techniques for traversing the search space for a three-way split vantage point tree partition 900. Document vectors 902 are partitioned into three clusters 904A-C by their distance to a vantage point, $V_N$, 906. Given a query vector, $V_Q$, 908, a ball 910 of radius R 912 centered at the query vector 908 is defined. It may then be determined whether the ball 910 intersects each of the three clusters, or partitions, 904A-C. As shown in FIG. 9, the ball 910 only intersects the second and third clusters 904B and 904C. Therefore, the document vectors 902 within the first cluster 904A may be discarded.

In addition, some of the document vectors 902 within the search space can also be removed due to the triangle inequality. For example, the distance, $d(V_N, V_D)$, 914 between each document vector 902 and the vantage point 906 may be determined, and the distance, $d(V_N, V_Q)$, 916 between the query vector 908 and the vantage point 906 may be determined. Using the triangle inequality, e.g., $d(V_D, V_Q) > \text{abs}(d(V_N, V_Q) - d(V_N, V_D))$, the search space can then be traversed by comparing $d(V_N, V_D)$ to $d(V_N, V_Q)$.

As opposed to vantage point trees, multi-vantage point trees allow a search to move down multiple branches of the tree that share a vantage point using a single distance computation. In contrast, vantage point trees rely on a distance computation for each branch of the tree that is to be searched.

A code fragment for defining structures used in multi-vantage point trees is shown below. In the code fragment, "nV" represents the number of vantage points, $n_V$; "nS" represents the number of splits per node, $n_S$; and "nL" represents the desired number of elements in leaf node, $n_L$. In addition, "DB" represents the distance boundaries of a given node, $D_B$; "vec" represents the total set of document dataset vectors, $V_T$; "pQuery" represents the pointer to the query vector, $v_Q$; and "radius" represents the radius of search for querying, R.

```
int nV: // number of vantage points
int nS: // number of splits
int nL: // number of elements in leaf nodes
in N: // number of vectors
int maxL: // maximum level of tree depth
int vecLength: // length of vector
VT: type used for dataset vectors;
DT: type used for distance computations;
// vector structure used to store vector as well as distances from vector to
// vantage points
struct
{
    VT vector[vecLength]; // vector of VT used to store vector
    DT pathDist[maxL]; // vector of DT used to store path distance
                       // between vatange point and this vector
} Vector;
struct
{
    Vector VP; // the vector used as the vantage point for this node
    DT DB[nS+1]; // vector of distance boundaries used to split
                 // data among child nodes
                 // child[i] (i=0,...,nS-1) corresponds to those
                 // vectors which are between DB[i] and DB[i+1]
                 // from vantage point
    Node child[nS]; // the nS child nodes
} Node;
Vector vec[N]; // array of "N" vectors
struct
{
```

-continued

```
    Node *pNode; // the pointer to the node being operated upon
    int levelV; // the index of current vantage point being worked on
    int levelT; // the level in the tree
    int iVecOffset; // offset into vec array
    int nVec; // number of vectors in this node cluster
} NodeParams;
```

A code fragment for creating multi-vantage point trees is shown below.

```
// MVP Tree Node Creation
CreateNode (NodeParams *rootParam)
{
    Queue<NodeParams> paramQ, nextParamQ;
    NodeParams *param;
    int v = -1;
    Vector VP; // the vantage poin being used
    paramQ.queue(rootParam);
    while (param = paramQ.dequeue( ))
    {
        Node *pNode = param -> pNode;
        if pNode -> nVec <= nL)
        {
          pNode -> child = NULL;
          continue; // no need to partition this node further
        }
        if param -> levelV != v)
        {
           v = v+1
           VP = PickVantagePoint( );
        }
        pNode -> VP = VP;
        // compute distances between vectors and vantage points
        for (i=0; i < param -> nVec; i++)
        {
            vec[param -> iVecOffset+i] . pathDist[param -> levelT] =
               ComputeDistance(vec[param -> iVecOffset+i], VP);
        }
        Sort(vec + param -> iVecOffset, param -> nVec, param ->
        levelT);
        // create and initialize child nodes
        for (i=0; i < nS; i++)
        {
            int offset = i*param -> nVec/nS;
            int nElem = (i+1)*param -> nVec/nS - offset;
            offset += param -> iVecOffset;
            if (param -> levelV+1 == nV)
            {
                nextParamQ.queue({pNode -> child+i, 0, param ->
                    levelT+1, offset, nElem});
            }
            else
            {
                paramQ.queue({pNode -> child+i,
                    param -> levelV+1, param ->
                    levelT+1, offset, nElem});
            }
            pNode -> DB[i] = vec[offset].pathDist[param -> levelT];
        }
        // something slightly larger than largest distance
        pNode -> DB[nS] = vec[param -> iVecOffest+param -> nVec-
            1].pathDist[param -> levelT*1.01;
    }
    while (param = nextParamQ.dequeue( ))
    {
        CreateNode(param);
    }
}
Node rootNode;
NodeParams param = {&rootNode, 0, 0, 0, N};
CreateNode(¶m);
```

A code fragment for searching multi-vantage point trees is shown below.

```
// MVP Tree Search
// pQuery: pointer to query
// radius: search radius
SearchNode(NodeParams *rootParam, Vector *pQuery, DT radius)
{
    Queue<int> nearest;
    Queue<NodeParams> paramQ, nextParamQ;
    NodeParams *param;
    int v = -1;
    DT dist; // distance between query and search node
    paramQ.queue(rootParam);
    while (param = paramQ.dequeue( ))
    {
        Node *pNode = param -> pNode;
        if (pNode -> child == NULL)
        {
           // reached leaf node
           for (i=1; i<param -> nVec; i++)
           {
              // triangle inequality check for
              for (k=0; k> param -> levelT; k++)
              {
                 if (abs(pQuery -> pathDist[k]-vec[param ->
                     iVecOffset+i].pathDist[k]) > radius)
                     break; // exit for "k" loop
              }
              if (k != param -> levelT)
                 continue; // not a valid candidate, go to next i
              if (ComputeDistance(pQuery, vec[param ->
                  iVecOffset+i]) <= radius)
                     nearest.queue(param -> iVecOffset+i);
           }
           continue; // go to next param in paramQ
        }
        if (param -> levelV != v)
        {
           dist = ComputeDistance(pQuery, pNode -> VP);
           pQuery -> pathDist[param ->levelT] = dist;
           v = v+1;
        }
        for (i=0; i<nS; i+++
        {
            int offset = i*param -> nVec/nS;
            int nElem = (i+1)*param -> nVec/nS - offset;
            offset += param -> iVecOffset;
            if (min(dist+radius, pNode -> DB[i+1]} >=
                max(dist-radius, pNode -> DB[i]))
            {
                if (param -> levelV+1 == nV)
                {
                    nextParamQ.queue({pNode -> child+i, 0,
                        param -> levelT+1, offset, nElem});
                {
                else
                }
                    paramQ.queue({pNode -> child+i, param ->
                        levelV+1, param -> levelT+1, offset,
                        nElem});
                }
            }
        }
    }
    while (param = nextParamQ.dequeue( ))
    {
       SearchNode(param, pQuery, radius);
    }
    return nearest;
}
// queue to store pointers to nearest neighbors
Queue<int> nearest;
Node rootNode;
NodeParams param = {&rootNode, 0, 0, 0, N};
nearest = SearchNode(¶m, &query, radius);
```

In some embodiments, after the multi-vantage point tree has been created, the database document vector set $V_T$ is sorted so that clusters corresponding to child nodes are placed in consecutive order. This may allow all the vectors corresponding to a given node to be found by an offset into the set $V_T$ and number of elements. In addition, if the tree is balanced, then this information may not be stored in the tree node, as it can be easily recomputed.

Figure 10:
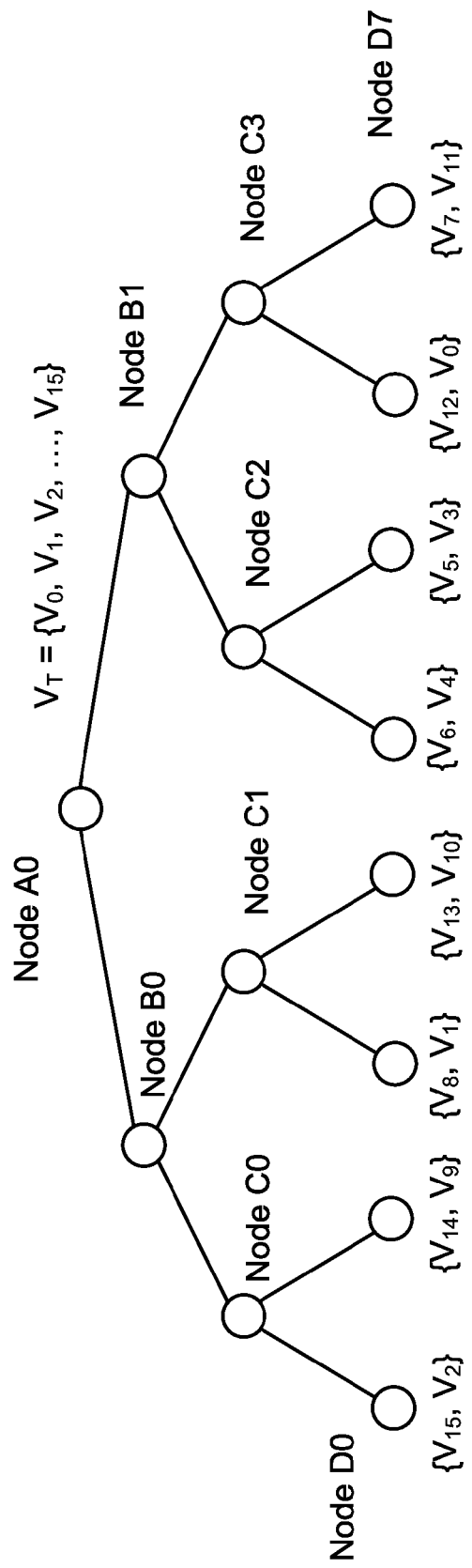
FIG. 10 is a schematic of a multi-vantage point tree for which the document vector set has been sorted so that clusters corresponding to child nodes are placed in consecutive order.

FIG. 10 is a schematic of a multi-vantage point tree 1000 for which the document vector set has been sorted so that clusters corresponding to child nodes are placed in consecutive order. For example, as shown in FIG. 10, all the eight document vectors corresponding to child node B0 in the multi-vantage point tree 1000, i.e., $v_{15}$, $v_2$, $v_{14}$, $v_9$, $v_8$, $v_1$, $v_{13}$, and $v_{10}$, can be found consecutively at an offset of zero.

In various embodiments, it may be desirable to find the C nearest neighbors using an MVP tree that corresponds to all document vectors that are within radius R. However, even after constructing an MVP tree partition, there will likely still be significantly more than C vectors left. For example, to find the 100 nearest neighbors, the $l^2$-norm, e.g., Euclidean distance, for 100,000 document vectors may have to be computed. However, searching such a large set of document vectors may be prohibitively expensive.

As an approximation, a bilinear search may be used to determine an R' such that simply using Eq. (20) gives some multiple (say α) of C vectors. That is, an R' is found so that the MVP tree search ends up at $$\frac{\alpha C}{n_L}$$

leaf nodes. Typically R'<R, that is, the radius used for finding the MVP tree clusters is less than the true radius. Then, αC Euclidean distances may be computed between the query vector $v_c$, and the dataset document vectors in the leaf nodes. By simply sorting the distance, the C nearest neighbors in this set of αC vectors may be found. However, since R'<R is used, some of the true nearest neighbors may be missed, and there may be false negatives as well as false positives, as discussed further with respect to FIG. 8.

From the above, it is clear that there is an easy way to find approximate nearest neighbors from an MVP tree. This may be accomplished by using a smaller radius than the true search radius when determining which clusters intersect the ball of radius R centered about the query vector. In fact, if R is the true radius, a different radius can be used in Eq. (15), say R'<R, and a different radius can also be used when traversing vectors using the triangle inequality of Eq. (20), say R"<R.

Figure 11:
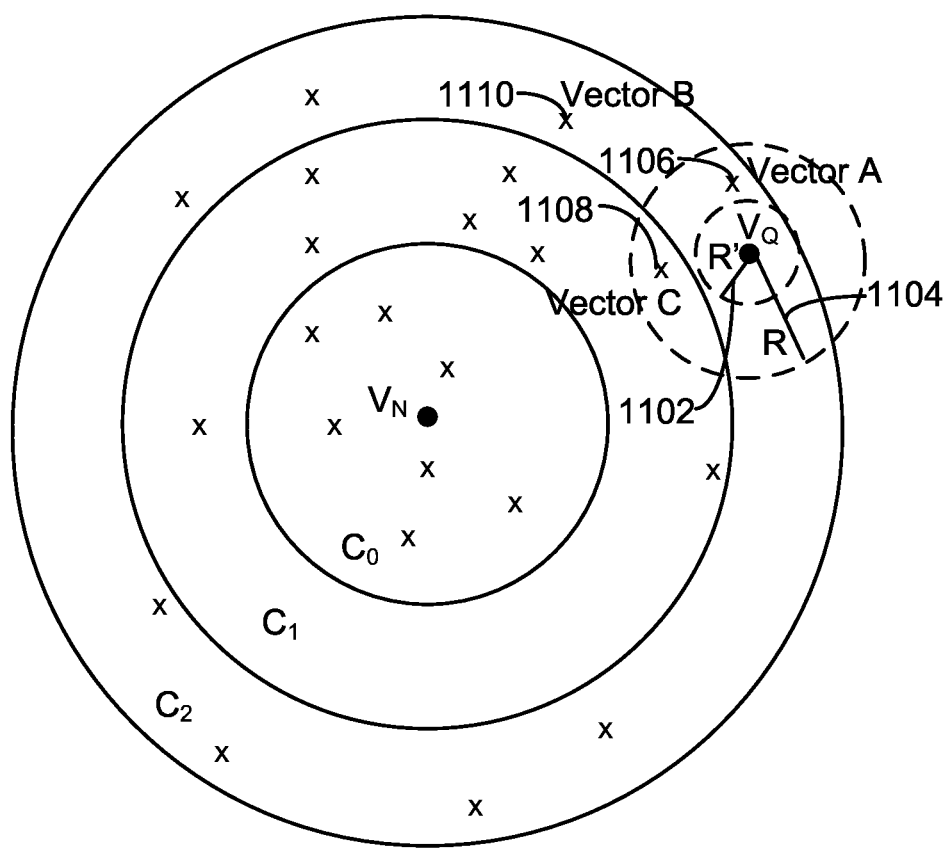
FIG. 11 is a schematic of a multi-vantage point tree partition for which an approximate search is performed.

FIG. 11 is a schematic of a multi-vantage point tree partition 1100 for which an approximate search is performed. Specifically, by using a smaller search radius R' 1102 than the true search radius R 1104 to find intersecting clusters, the search space may be reduced at the expense of potentially missing true nearest neighbors. For example, according to the embodiment shown in FIG. 11, vector A 1106 and vector C 1108 are the two true closest neighbors. However, by using the smaller search radius 1102, vector A 1106 and vector B 1110 are obtained as the two closest neighbors.

MVP trees and VP trees introduce a natural partitioning of the dataset into clusters. A simple way to use MVP trees in a BOW setting is to simply label each child node of the MVP tree with a word, as discussed further with respect to FIG. 12.

Figure 12:
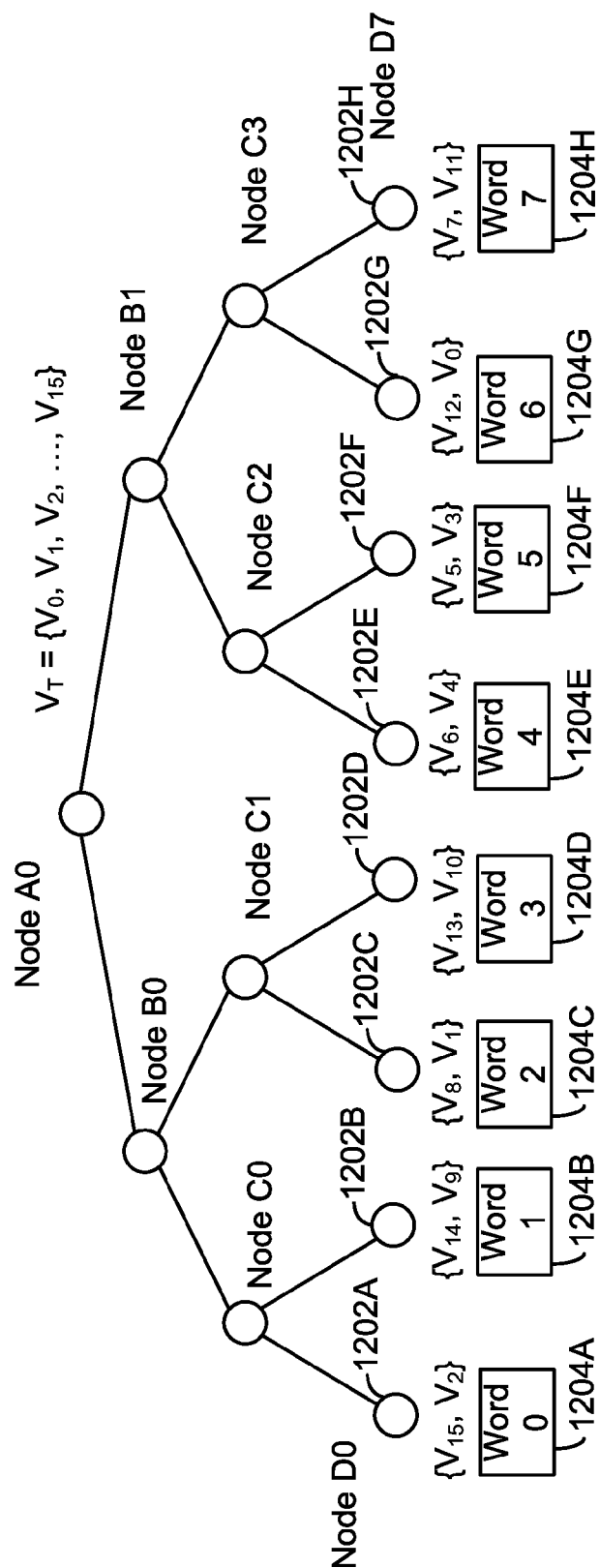
FIG. 12 is a schematic of a multi-vantage point tree for which each child node is labeled with a word.

FIG. 12 is a schematic of a multi-vantage point tree 1200 for which each child node 1202A-H is labeled with a word 1104A-H. Labeleing each child node 1202A-H with a word 1204A-H allows the corresponding MVP tree to be used in a classical BOW setting without modifying the existing pipeline used in many search implementations.

In other words, each vector can result in a query that is something to the effect of word 1 or word 3 or word 4, for example. However, as opposed to simply using a reverse lookup and histogram intersection, the quantization step can be controlled using the following technique. If a given feature vector from the query document maps to multiple words, as shown in FIG. 12, the query document may be considered to contain all the words. If the quantization step is large, a single feature vector may be mapped to many words. However, the set of words may be different for each vector. Therefore, it may be similar to providing all advantages of the overlapping cell approach. However, if the number of words is too large, the number of words may be decreased by reducing the search radius. This may provide all the advantages of the overlapping cell approach with an additional parameter that can be used to control the quantization step size. In addition, since the fundamental cell size is controlled by the number of vectors in the leaf node, this may be made to be fairly fine so that the boundary effect does not become an issue.

Therefore, quantization cells of a desired size may be formed by combining smaller cells of small size. As opposed to predetermining this composition, this cell is formed in response to the query vector itself. Therefore, the cells are centered about the query vector, and the query vector is not on the boundary. This method of cell combination using a tree is not limited to the use of an MVP or VP tree but, rather, can also be applied to any other suitable tree structure.

Since the total set of vectors, $V_T$, may be very large, the vectors may be distributed among a set of computing devices in order to perform nearest neighbor search in a practical setting. The use of MVP trees can lead to a simple and elegant distributed solution without incurring significant additional overhead. As an example, for trivial implementations, the vectors may simply be partitioned among all the computing devices, and the vectors may then be treated as distinct sets of data.

Figure 13:
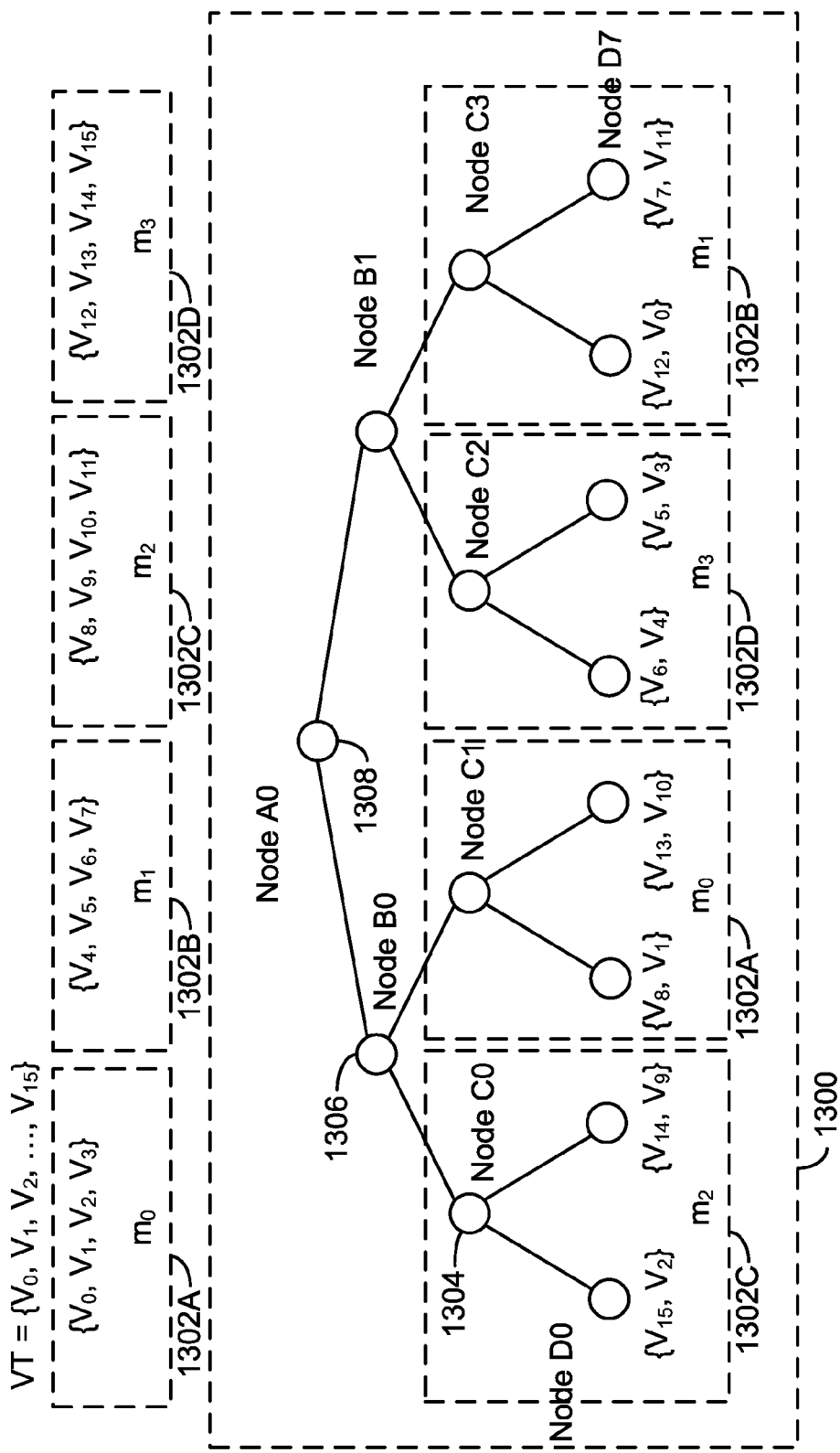
FIG. 13 is a schematic of a vantage point tree that has been distributed across four computing devices.

FIG. 13 is a schematic of a vantage point tree 1300 that has been distributed across four computing devices 1302A-D. Each computing device, i.e., computing device $m_0$, 1302A, computing device $m_1$ 1302B, computing device $m_2$ 1302C, and computing device $m_3$ 1302D, may include four document vectors from a dataset including sixteen document vectors. A trivial implementation would simply treat each of these four sets of document vectors as being distinct and would create four VP trees, i.e, one per computing device 1302A-D. A query would be sent to all the computing devices 1302A-D. Each computing device 1302A-D would return its result, and the results would simply be aggregated. However, this would not be an optimal implementation since cross computing device document vectors that belong in the same cluster would not be able to merge.

An optimal VP tree that treats all data spread across the computing devices 1302A-D as a single set of data can be created by simply storing the lower levels of the tree distinctly across the various computing devices 1302A-D. For example, as shown in FIG. 13, the subtree emanating from node C0 1304 can be stored in computing device $m_2$ 1302C. The upper levels of the tree may be replicated across the computing devices 1302A-D. For example, node B0 1306 may be replicated across the computing device $m_2$ 1302C and the computing device $m_0$ 1302A. In addition, node AO 1308 may be replicated across all the computing devices 1302A-D, as discussed further with respect to FIG. 14.

Figure 14:
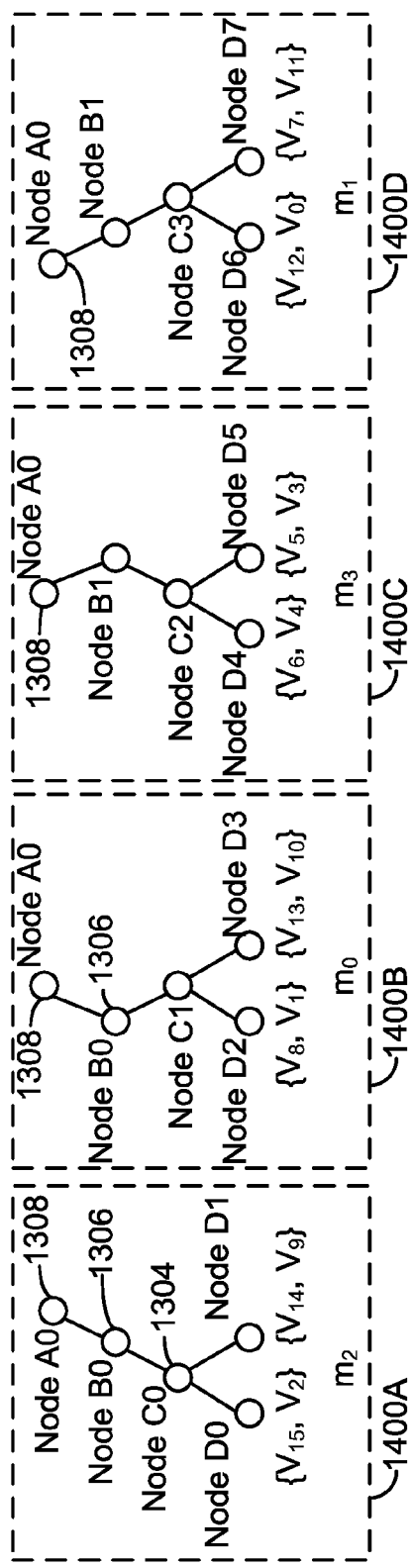
FIG. 14 is a schematic of a structure of the vantage point tree of FIG. 13 within each computing device.

FIG. 14 is a schematic of a structure 1400A-D of the vantage point tree 1300 of FIG. 13 within each computing device 1302A-D. Like numbered items are as described with respect to FIG. 13. The structure 1400A-D of the vantage point tree 1300 within each computing device 1302A-D may result from the replication of the upper level nodes of the vantage point tree 1300 of FIG. 13 across the computing devices 1302A-D. For example, as discussed above, node AO 1308 may be replicated across all the computing devices 1302A-D, and node B0 1306 may be replicated across the computing device $m_2$ 1302C and the computing device $m_0$ 1302A. Thus, the structures 1400A-B of the vantage point tree 1300 within the computing device $m_2$ 1302C and the computing device $m_0$ 1302A share common upper levels nodes, and only the lower levels nodes differ between the two computing devices 130C and 1302A.

Construction of an MVP tree using a distributed implementation also has an elegant implementation. Suppose there are $n_M$ computing devices with N total document vectors, each computing device having $$\frac{N}{n_M}$$

document vectors. Suppose also that the MVP tree has already been constructed up to a particular node, as discussed with respect to FIGS. 15A and 15B. One of the $n_M$ computing devices can be a coordinator that receives a request from an upper level to start construction of an MVP node. This coordinator can select a vantage point for the MVP node and instruct each computing device to compute (in a distributed manner) the distance between each of the document vectors on each computing device and the vantage point.

Once the distances have been computed, a distributed sort can be performed. This distributed sort may sort the document vectors by their distance to the selected vantage point using any suitable type of distributed sorting algorithm. The distributed sort will also sort the computing devices in the sense that computing devices including document vectors with smaller distances will be virtually placed on one end of the MVP tree. This computing device sorting is stored in a global machine mapping that includes information regarding computing device ordering. The global machine mapping can be easily stored in all the computing devices in the cluster, and can be used when a query is performed. After sorting, the $n_M$ computing devices can be partitioned into $n_S$ clusters of $$\frac{n_M}{n_S}$$

computing devices each. In an MVP tree (as opposed to a VP tree), the coordinator can repeat this process for each of the $n_V$ vantage points for an MVP node.

Figure 15A:
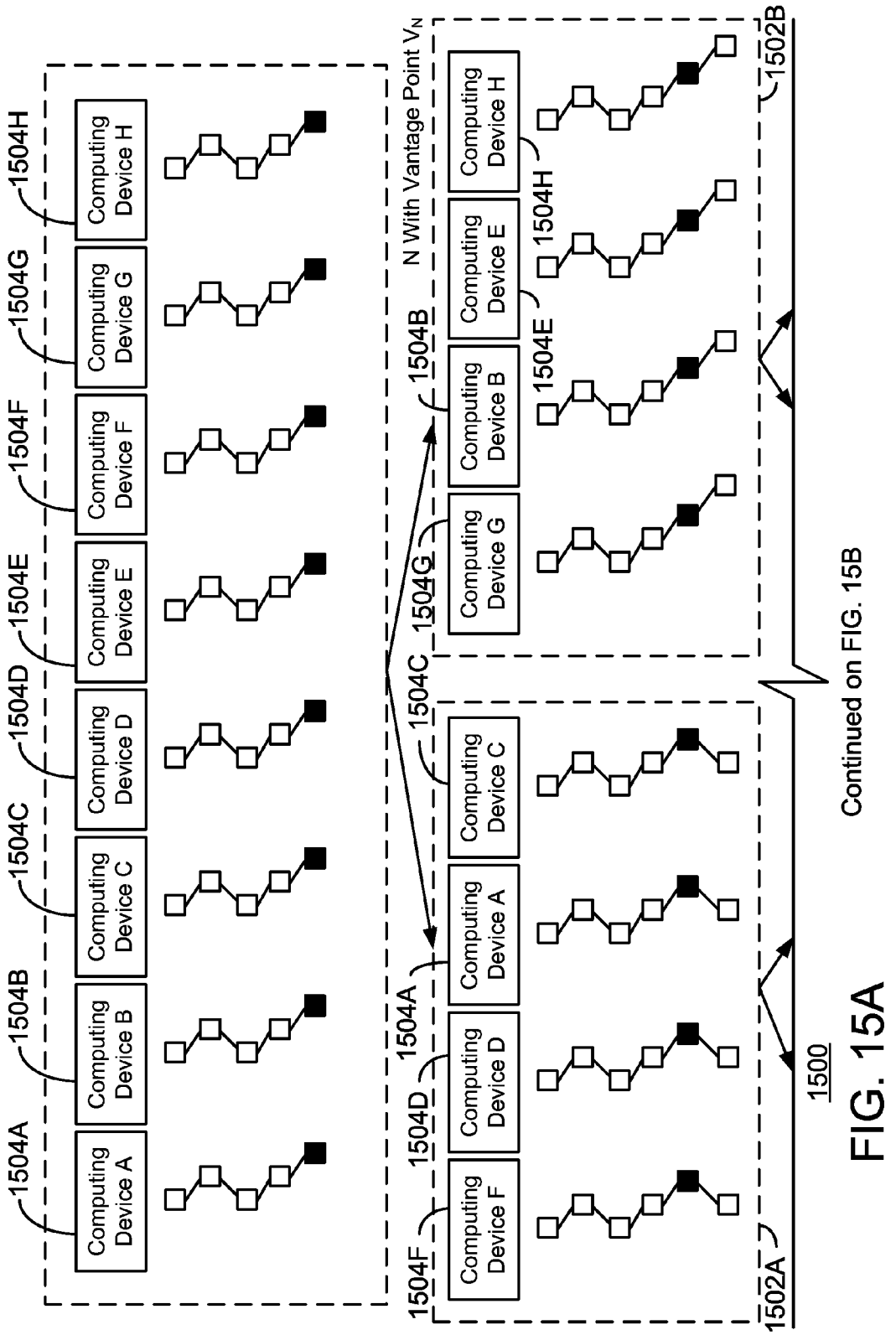
FIGS. 15A and 15B are a schematic of a distributed multi-vantage point tree.
Figure 15B:
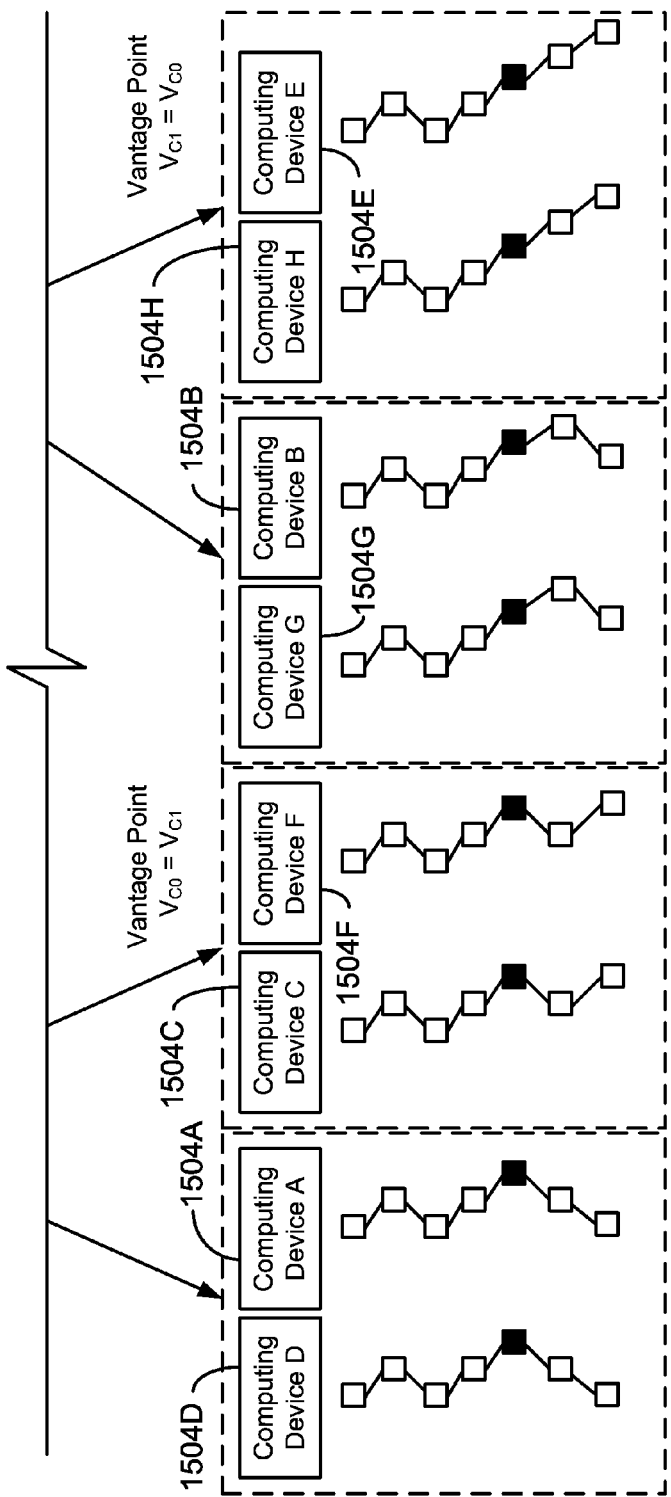

FIGS. 15A and 15B are a schematic of a distributed multi-vantage point tree 1500. The distributed multi-vantage point tree 1500 includes two clusters 1502A and 1502B ($n_S$=2), eight computing devices 1504A-H ($n_M$=8), and two vantage points ($n_V$=2). In other words, the eight computing devices 1504A-H may be partitioned into two clusters 1502A and 1502B of four computing devices each.

After the computing devices have been partitioned into clusters, the coordinator may randomly choose a computing device from each of the sub-clusters that were created, and may send a request to that computing device to be the new coordinator for the sub-cluster. The process may then be repeated. The computing devices may be partitioned using this mechanism until the entire cluster resides on a single computing device, or until $n_L$ vectors are in the leaf node, whichever occurs first. Typically, the first condition will occur first since $n_L$ will typically be much less than the capacity of each computing device, as discussed with respect to FIG. 16.

Figure 16:
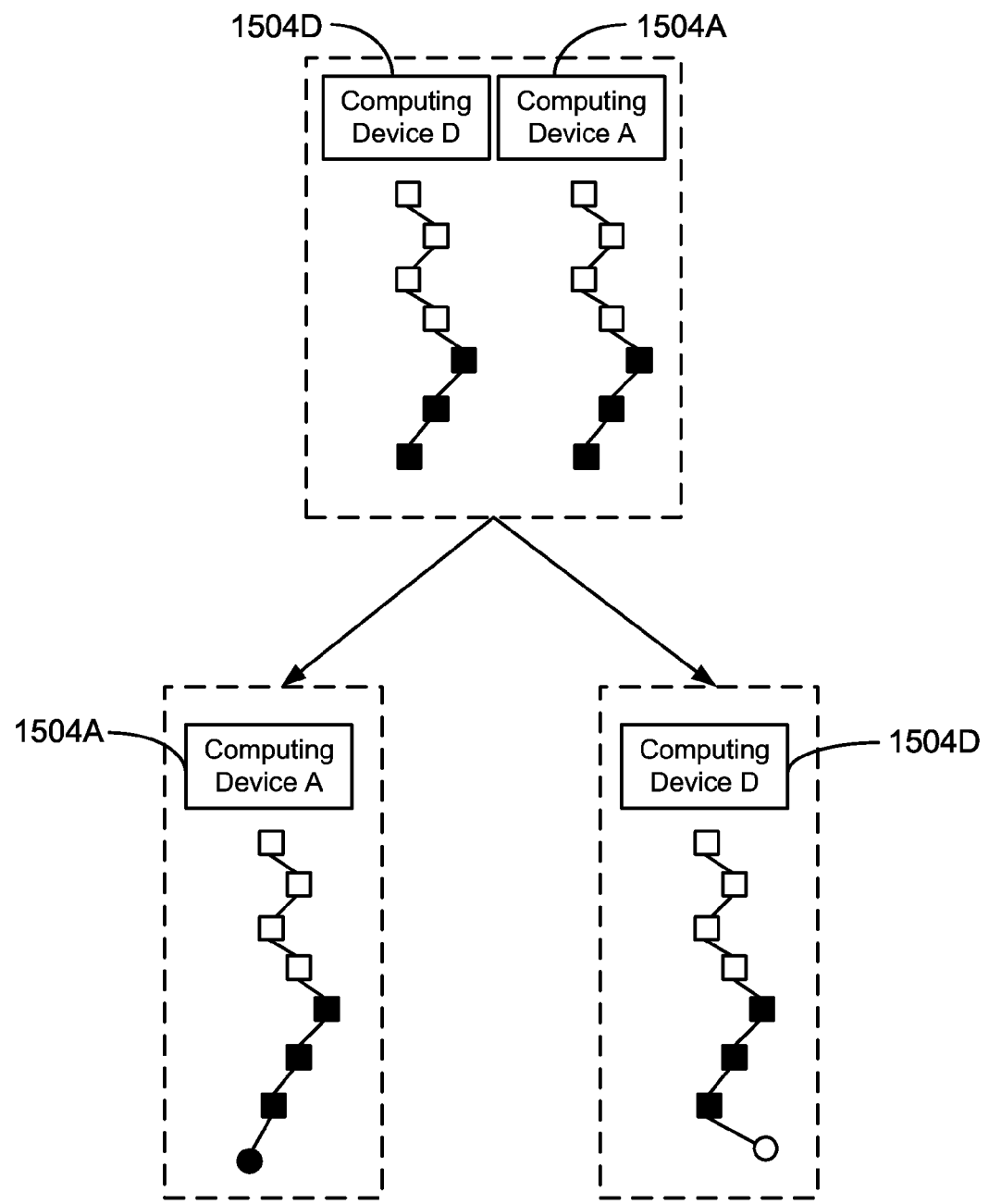
FIG. 16 is a schematic of a final partitioning of the distributed multi-vantage point tree of FIGS. 15A and 15B onto a single computing device.

FIG. 16 is a schematic of a final partitioning 1600 of the distributed multi-vantage point tree 1500 of FIGS. 15A and 15B onto a single computing device. Like numbered items are as described with respect to FIGS. 15A and 15B. As shown in FIG. 16, the entire cluster resides on computing device A 1504A once the partitioning of the computing devices 1504A-H has been completed.

During MVP tree construction, if the single computing device condition is reached in the middle of $n_V$ vantage points, the process is stopped. For example, if two vantage points are being used, the process will still be stopped if the single computing device condition is reached after partitioning for a single vantage point. Once the single machine condition is reached, regular VP or MVP tree construction can be used to create the lower levels of the tree, as discussed with respect to FIG. 17.

Figure 17:
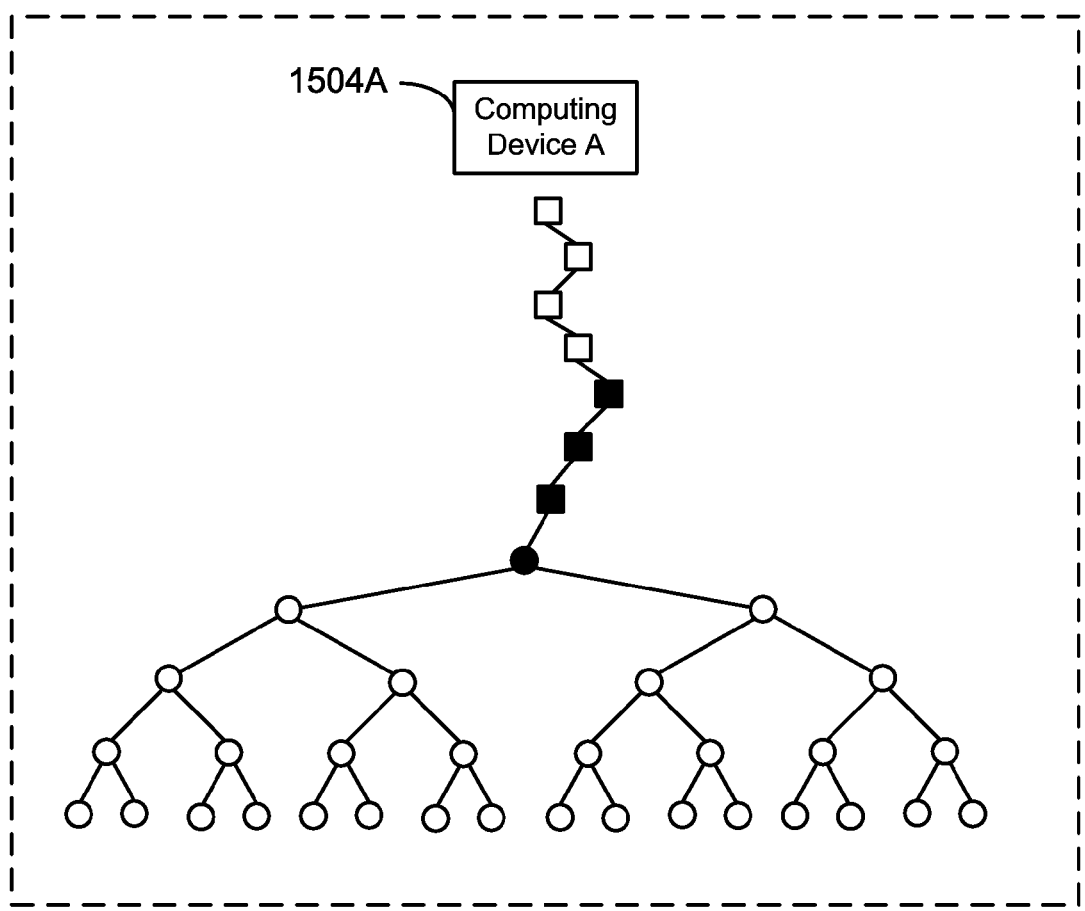
FIG. 17 is a schematic of a distributed multi-vantage point tree constructed via a single computing device.

FIG. 17 is a schematic of a distributed multi-vantage point tree 1700 constructed via a single computing device. Like numbered items are as described with respect to FIGS. 15A and 15B. Specifically, the distributed multi-vantage point tree 1700 may be constructed via the computing device A 1504A once the single computing device condition has been reached.

An incoming query may be randomly sent to any computing device in the cluster. Since all computing devices in the cluster include information regarding the root node of the tree, any computing device can perform the first level of the search. This computing device becomes the initial coordinator and computes the distance between the query vector and the vantage point. Depending on this distance, the coordinator can then send the query vector to some subset of the sub-clusters. The computing device chosen is randomly chosen from the set of computing devices in charge of the sub-cluster by looking at the global machine mapping.

For example, according to the embodiment shown in FIGS. 13 and 14, the query vector may be randomly sent to any of the four computing devices 1302A-D since all the computing devices 1302A-D include the root node AO 1308. The randomly chosen computing device 1302A-D then becomes the coordinator. Suppose the distance computation indicates that the search is to move down to node B0 1306, but not node B1. The coordinator may then randomly select a computing device from the computing device $m_2$ 1302C and the computing device $m_0$ 1302A, and send the query to this computing device since both contain node B0 1306. Suppose the distance computation indicates that the search is to move down to both node C0 and C1. In this case, the query is sent to both computing device $m_2$ 1302C and computing device $m_0$ 1302A, and a standard query is executed on both computing devices. The results are returned from each of these computing devices and are then aggregated by the coordinating computing device. Finally, the top level, or root node, coordinator returns the final result to the user or to some other computing device that is configured to perform further L2 ranking. In various embodiments, randomly choosing the coordinator from the computing devices allows for inherent load balancing.

The distributed MVP tree can be stored in a limited amount of memory. The document vectors can be stored in flash memory, since the document vectors are read-only. The MVP tree construction can be stored in RAM or flash memory.

As an example, suppose there are 10 billion images, where each image includes 30 feature vectors, each vector is of dimension 128, and each component is a 4 byte float or fixed point. Then, the total amount of memory used to hold the feature vectors for the database documents, if they are divided among 1024 computing devices, would be 150 GB per computing device. If it is assumed that a VP or MVP tree with a two-way split is used, then the data clusters will be on a single computing device after 10 levels. The 300 billion document vectors may be split such that there are 300 million document vectors on each computing device. After 20 levels of splitting, there may be about 290 vectors per leaf, which is less than a desired number of 500. Thus, 2,097,151 nodes may be used for the lower levels of the tree on each computing device, and 10 nodes may be used for the upper level of the tree.

Each node includes a vantage point and distance boundaries. For a two-way split, this uses approximately 128*4+2*4+2*4=528 bytes per node (e.g., 4 bytes per each component of the vantage point, 4 bytes for each of the distance boundaries, and 4 bytes per child pointer). Thus, only approximately 2097161*528≈1e9 bytes, i.e., about 1 GB, of memory may be used to hold the tree structure. This may be accomplished using RAM.

If, in addition to the feature vectors, the path distances between each vector and the 30 vantage points are used, an additional 35 GB of memory may be used. This results in a total of approximately 185 GB of flash memory per computing device, which is also feasible using SSD drives. Further, with some minor additional information regarding vector geometry information, the same computing devices can also be used to perform L2 ranking, since the computing devices already have the feature vectors.

In various embodiments, there are at least two techniques for searching an MVP tree to find documents that are nearest to, or most closely match, a query. The first technique involves receiving an incoming query and finding nearest neighbors for each feature using the approximate MVP algorithm. Specifically, α may be chosen to trade-off between search accuracy and complexity. A low α involves less complexity. If α is sufficiently large so that R'≥R, there will be no false negatives. Only false positives will be present in the result. Such false positives may then be removed from the result. After the nearest neighbors are obtained for each vector, final document scoring may be performed to obtain the similar documents. The second technique involves receiving an incoming query and determining a radius such that an appropriate number of words are found for each feature vector. A reverse index table may then be used to compute a histogram intersection using a BOW model.

A code fragment for defining structures used in distributed multi-vantage point trees is shown below.

```
// Distributed MVP Tree Construction
// Global variable shared over all machines (computing devices) - each machine
// may have its own copy
int Machines; // total number of machines being used
IPAddress machineToIP[nMachines]; // mapping of machine ID to IP address
// following structures are used to describe machine level information and upper
// levels of MVP tree that is stored in a distributed manner
struct
{
        Vector VP; // vector used as the vantage point for this node
        DT DB[nS+1]; // vector of distance boundaries used to split data among
                    // child nodes
                    // child[i] (i=0,...,nS-1) corresponds to those vectors that are
                    // between DB[i] and DB[i+1] from vantage point
} MachineNode;
struct
{
        MachineNode *pNode;
        int levelV;
        int levelT; // the level in the tree
        int iMachineOffset; // first machine in cluster
        int nMachines; // number of machines in cluster
} MachineNodeParams;
// each machine has its own veresion of the following variables
// used to represent upper levels of tree that is stored in distributed manner - size
// can be less than maxL
MachineNode mNodes[maxL];
// each machine is in charge of the following "N/nMachines" vectors
int nVecPerMachine = N/nMachines;
Vector machineVec[nVecPerMachine];
// root node for local MVP tree
Node machineRootNode;
// the following function is used to send message to start functions on other
// machines
StartOnMachine(IPAddress ip, Function(Param))
{
        // Send message to "ip" address to start "Function" with parameters given in
        // "Param"
        // returns handle which can be used to wait for function completion on
        // remote machine
}
```

A code fragment for creating distributed multi-vantage point trees is shown below.

```
// Runs on one of the machines in this cluster that is the "coordinator"
CreateMachineNode(MachineNodeParams *rootParam)
{
    Queue<MachineNodeParams> paramQ, nextParamQ, nextMVPQ;
    MachineNodeParams *param;
    int v = -1;
    Vector VP; // the vantage point being used
    paramQ.queue(rootParam);
    while (param = paramQ.dequeue( ))
    {
        MachineNode *pNode = param -> pNode;
        // pNode -> nVec is approximately (N/nMachines) *pNode ->
        // nMachines
        if (nVecPerMachine *pNode -> nMachines <= nL)
        {
            continue; // no need to partition this node further
        }
        if (param -> levelV != v)
        {
            v = v+1;
            VP = PickVantagePoint( );
        }
        pNode -> VP = VP;
        // compute distances between vectors and vantage points
        for (i=0; I < param -> nMachines; i++)
        {
            handle[i] = StartOnMachine (machineToIP[param ->
                          iMachineOffset+i], ComputeDistance(pNoide ->
                          DB, pNode -> VP, param -> levelT));
        }
        WaitForFinish(handle); // wait for all machines to finish distance
                              // computation
        // the following distributed sort sorts the vectors on the machine
        // as well as modifies the machineToIP table by sorting the
        // machines
        PerformDistributedSort(param -> iMachineOffset, param ->
                      iMachineOffset+param -> nMachines,
                      param -> levelT);
        //create and initialize child machines
        for (i=0; I < nS; i++)
        {
            int offset = i*param -> nMachine/nS;
            int nElem = (i+1)*param -> nMachine/nS – offset;
            offset += param -> iMachineOffset;
            if (nElem == 0)
            {
                // do nothing
            }
            else if (nElem == 1)
            {
                nextMVPQ.queue({0, param -> levelT+1, offset,
                              nElem});
            }
            else if (param -> levelV+1 == nV)
            {
                nextParamQ.queue({0, parma -> levelT+1, offset,
                              nElem});
            }
            else
            {
                paramQ.queue({param -> levelV+1, param ->
                              levelT+1, offest, nElem});
            }
            pNode -> DB[i] = GetFinalMachineDist(machineToIP
                              [offset], param -> levelT);
        }
        // something slightly larger than largest distance
        pNode -> DB[nS] = GetMachineDist(machineToIP[param ->
                      iMachineOffset+param -> nMachines – 1],
                      param -> levelT) * 1.01;
        // broadcast the distance boundaries and vantage point
        for (i=0; I < param -> nMachines; i++)
        {
            StartOnMachine(UpdateInfo(machineToIP[param ->
                          iMachineOffset+i], pNode -> DB, pNode -> VP,
                          param -> levelT));
        }
    }
    while (param = nextParamQ.dequeue( ))
    {
        iMachine = PickRandomValBetween(0 ... param ->
                          nMachines-1);
        StartOnMachine(machineToIP[param -> iMachineOffset+
                          iMachine], CreateMachineNode(param));
    }
    while (param = nextMVPQ.dequeue( ))
    {
        StartOnMachine(machineToIP[param -> iMachineOffset],
                          CreateMachineMVPNode(param));
    }
}
// to start, run on any machine in cluster
MachineNode machineRootNode;
MachineNodeParams param = {&machineRootNode, 0, 0, 0, nMachines};
CreateMachineNode(¶m);
```

Another code fragment for creating distributed multi-vantage point trees is shown below.

```
// When called, computes distances between vantage point and all vectors
// on machine
ComputeDistance(DT DB[ ], Vector VP, int levelT)
{
    for (i=0; i < nVecPerMachine; i++)
    {
        machineVec[i].pathDist[levelT] =
        ComputeDistance(machineVec[i], VP);
    }
}
// when called starts local, per-machine MVP tree creation from levelT for
// the lower levels of the tree
CreateMachineMVPNode(MachineNodeParams *param)
{
    NodeParams param = {&machineRootNode, 0, param -> levelT,
                          machineVec, nVecPerMachine};
    CreateNode(¶m);
}
// when called, updates the nodes that represent upper levels of tree (the
// distributed portion) with distance boundaries and vantage points
UpdateInfo(DT DB[ ], Vector VO, int levelT)
{
    for (i=0; I <= nS; i++)
        mNodes[levelT].DB[i] = DB[i];
    mNodes[levelT].VP = VP;
}
PerformDistributedSort(int startMachine, int endMachine, int levelT)
{
    // Perform sort using distributed sorting algorithm on all machines in
    // range of machineToIP[startMachine ... endMachine-1]
    // Sort will sort using "machineVec[.]. pathDist[levelT]"
    // After sorting both of the following will be rearranged;
    // 1. machineVec array on each of the machines
    // 2. the machineToIP mapping will also be modified
}
```

A code fragment for searching distributed multi-vantage point trees is shown below.

```
// pQuery: pointer to query
// radius: search radius
SearchMachineNode(MachineNodeParams *rootParam, Vector, *pQuery, DT radius)
{
    Queue<int> nearest;
```

```
Queue<NodeParams> paramQ, nextParamQ, nextMVPQ;
NodeParams *param;
int v = -1;
DT dist; // distance between query and search node
paramQ.queue(rootParam);
while (param = paramQ.dequeue( ))
{
    int iMachine = PickRandomValBetweeen(0...param -> nMachines-1);
    // get DB and vantage point for this node from machine in range
    Node node = ObtainNodeInfo(machineToIP[param ->
            iMachineOffset + iMachine], param -> levelT);
    Node *pNode = &node;
    if (nVecPerMachine *pNode -> nMachines <= nL)
    {
        Queue<int> machineNearest[param -> nMachines];
        for (i=0; i < param -> nMachines; i++)
        {
            handle [i] = StartOnMachine(machineToIP[param ->
                    iMachineOffset], machineNearest[i] =
                    SearchMachineVecs(pQuery, radius,
                    param -> levelT));
        }
        WaitForFinish(handle);
        for (i=0; I < program -> nMachines; i++)
        {
            // add offset to adjust for machine index
            nearest.addToQueue((param ->
                    iMachineOffset+i)*nVecPerMachine +
                    machineNearest[i]);
        }
        continue; // go to next param in paramQ
    }
    if (param -> levelV != v)
    {
        dist = ComputeDistance(pQuery, pNode -> VP);
        pQuery -> pathDist[param -> levelT] = dist;
        v = v+1;
    }
    for (i=0; i < nS; i++)
    {
        int offset = i*param -> nMachines/nS;
        int nElem = (i+1)*param -> nMachines/nS - offset;
        offset += param -> iMachineOffset;
        if (min(dist + radius, pNode -> DB [i+1]) >=
            max(dist - radius, pNode -> DB[i]))
        {
            if (nElem == 0)
            {
                // do nothing
            }
            else if (nElem == 1)
            {
                nextMVPQ.queue({0, param -> levelT+1,
                        offset, nElem});
            }
            if (param -> levelV + 1 == nV)
            {
                nextParamQ.queue({0, param -> levelT+1,
                        offset, nElem});
            }
            else
            {
                paramQ.queue({param -> levelV+1, param -
                        > levelT+1, offset,
                        nElem});
            }
        }
    }
}
// search future machine nodes
Queue<int> machineNearest[nextParamQ.size( )];
for (i=0; i < nextParamQ.size( ); i++)
{
    param = nextParamQ(i); // i-th element in queue
    iMachine = PickRandomValBetweeen(0 ... param -> nMachines-1);
    handle[i] = StartOnMachine(machineToIP[param -> iMachineOffset
            + iMachine], machineNearest[i] =
            SearchMachineNode(param, pQuery,
            radius));
```

```
    }
    WaitForFinish(handle)]
    for (i=0; i < nextParamQ.size( ); i++)
    {
        nearest.addToQueue(machineNearest[i]);
    }
    Queue<int> machineMVPNearest[nextMVPQ.size( )];
    for (i=0; i < nextMVPQ.size( ); i++)
    {
        param = nextMVPQ(i); // i-th element in queue
        handle[i] = StartOnMachine(machineToIP[param ->
                iMachineOffset], machineMVPNearest[i] =
                SearchMachineMVPNode(param, pQuery, radius));
    }
    WaitForFinish(handle);
    for (i=0; i < nextMVPQ.size( ); i++)
    {
        // adjust indices for machine offset
        nearest.addToQueue((param -> iMachineOffset+i)
                    *nVecPerMachine+machineMVPNearest[i]);
    }
    return nearest;
}
// queue to store pointers to nearest neighbors
Queue<int> nearest;
Node rootNode;
MachineNodeParams param = {&rootNode, 0, 0, 0, N};
SearchMachineNode(¶m, &query, radius);
```

Another code fragment for searching distributed multi-vantage point trees is shown below.

```
SearchMachineVecs(Vector *pQuery, DT radius, int levelT)
{
    Queue<int> machineNearest;
    for (i=0; i <nVecPerMachine; i++)
    {
        for (k=0; k < levelT; k++)
        {
            if (abs(pQuery -> pathDist[k] - pNode - machineVec[i] .
                pathDist[k]) > radius)
                break; // exit for "k" loop
        }
        if (k != levelT)
            continue; // not a valid candidate, go to next i
        if (ComputeDistance(pQuery, machineVec[i]) <= radius)
            machineNearest.queue(machineVec+i);
    }
    return machineNearest;
}
SearchMachineMVPNode(MachineNodeParams *rootParam,
Vector *pQuery, DT
        radius)
{
    NodeParams param = {&machineRootNode, 0, param -> levelT,
            machineVec, nVecPerMachine);
    return SearchNode(¶m, pQuery, radius);
}
```

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining documents that are nearest to a query, the method comprising:
    constructing, by a computer processor, a vantage point tree based on a plurality of document vectors;
    searching, by a computer processor, the vantage point tree to determine a plurality of nearest neighbor document vectors to a query vector by removing a portion of the plurality of document vectors from the vantage point tree based on one or more vantage points for each of a plurality of nodes in the vantage point tree and a specified search radius centered about the query vector;
    removing any of the plurality of document vectors belonging to document clusters that do not intersect a hypersphere of the specified search radius centered about the query vector;
    removing any of the plurality of document vectors that do not satisfy a triangle inequality condition for the specified search radius between one of the one or more vantage points, the document vector, and the query vector; and
    adjusting the specified search radius such that only a specified number of nearest neighbor document vectors are remaining after document vectors that are outside the hypersphere of the specified search radius for the query vector and document vectors that do not satisfy the triangle inequality condition have been removed.

2. The method of claim 1, wherein determining the plurality of nearest neighbor document vectors to the query vector comprises determining a specified number of the plurality of document vectors that are nearest to the query vector.

3. The method of claim 1, comprising ranking documents corresponding to the plurality of nearest neighbor document vectors based on a relevance of each document to a query corresponding to the query vector.

4. The method of claim 1, wherein searching the vantage point tree to determine the plurality of nearest neighbor document vectors to the query vector comprises:
    calculating a distance between each remaining document vector and the query vector;
    sorting the calculated distances; and
    determining the plurality of nearest neighbor document vectors to the query vector based on the distance between each remaining document vector and the query vector.

5. The method of claim 4, wherein removing a document vector that does not satisfy the triangle inequality condition comprises:
- calculating a first distance range between the query vector and one of the one or more vantage points;
- calculating a second distance range between the document vector and the one of the one or more vantage points;
- determining whether an absolute value of a difference between the first distance range and the second distance range is greater than the specified search radius; and
- if the absolute value is greater than the specified search radius, removing the document vector.

6. The method of claim 1, wherein the vantage point tree comprises a multi-vantage point tree comprising a plurality of vantage points for each node in the vantage point tree.

7. The method of claim 6, wherein constructing the multi-vantage point tree comprises, for each of the plurality of nodes, partitioning the plurality of document vectors in the node into clusters based on a distance of each of the plurality of document vector from the plurality of vantage points.

8. The method of claim 7, wherein a first vantage point of the plurality of vantage points is selected from a random node in a cluster, and wherein a second vantage point of the plurality of vantage points is selected from a node in the cluster that is the farthest from the random node.

9. The method of claim 8, wherein searching the vantage point tree to determine the specified number of nearest neighbor document vectors comprises removing any of the clusters that do not intersect the hypersphere of the specified search radius centered about the query vector.

10. The method of claim 7, wherein partitioning the plurality of document vectors into the clusters comprises:
- calculating a distance of each document vector to one of the plurality of vantage points,
- sorting the distances;
- determining N−1 radii that roughly partition the document vectors into N equally sized clusters; and
- recording the N−1 radii in a partitioning node to aid in traversal of the multi-vantage point tree.

11. A computing system for determining documents that are nearest to a query, comprising:
- a processor that is adapted to execute stored instructions; and
- a system memory, wherein the system memory comprises code configured to:
  - construct a vantage point tree based on a plurality of document vectors;
  - traverse the vantage point tree using one or more vantage points for each of a plurality of nodes in the vantage point tree by removing any of the plurality of document vectors that are outside a hypersphere of a specified search radius centered about a query vector and remove any of the plurality of document vectors that do not satisfy a triangle inequality condition for the specified search radius between a vantage point, the document vector, and the query vector;
  - determine a plurality of nearest neighbor document vectors to the query vector based on a distance between each remaining document vector and the query vector; and
  - adjust the specified search radius such that only a specified number of nearest neighbor document vectors are remaining after document vectors that are outside the hypersphere of the specified search radius for the query vector and document vectors that do not satisfy the triangle inequality condition have been removed.

12. The system of claim 11, wherein the system memory comprises code configured to:
- calculate a first distance range between the query vector and the vantage point;
- calculate a second distance range between one of the plurality of document vectors and the vantage point;
- determine whether an absolute value of a difference between the first distance range and the second distance range is greater than the specified search radius; and
- if the absolute value is greater than the specified search radius, remove the one of the plurality of document vectors.

13. The system of claim 11, wherein the system comprises a plurality of computing devices; wherein construction of child nodes for a vantage point tree node in upper levels of the vantage point tree is performed using a coordinating computing device randomly chosen from the plurality of computing devices which contain document vectors corresponding to the vantage point tree node; and wherein the system memory of the coordinating computing device is configured to:
- determine a vantage point; and
- send the vantage point to each of the plurality of computing devices; and wherein the system memory of each of the plurality of computing devices is configured to compute distances between the document vectors corresponding to the vantage point tree node that are stored on the computing device and the vantage point; and wherein the system memory of the coordinating computing device is further configured to:
- redistribute the document vectors stored on the plurality of computing devices according to the distances; and
- partition the plurality of computing devices according to the distances to construct the child nodes; and
- wherein the process is repeated until all the document vectors corresponding to the vantage point tree node reside on a single computing device, and wherein lower levels of the vantage point tree are constructed using document vectors on the single computing device and a vantage point for each node in the lower levels of the vantage point tree.

14. The system of claim 11, wherein the system comprises a plurality of computing devices; wherein traversing the document vector search space using the vantage point tree comprises traversing a set of child nodes for a specified vantage point tree node by sending the query vector to a coordinating computing device chosen from the plurality of computing devices which contain document vectors corresponding to the specified vantage point tree node; and wherein the system memory of the coordinating computing devices is configured to:
- traverse the vantage point tree by removing child nodes of document vector clusters that are outside a hypersphere of the specified search radius centered about the query vector;
- repeat until all document vectors for the given vantage point tree node reside on the coordinating computing device;
- search lower levels of the vantage point tree using the query vector and the specified search radius to determine vantage point tree nodes that are to be searched; and wherein the system memory of each of the plurality of computing devices corresponding to the vantage point tree nodes that are to be searched is configured to:
remove any of the document vectors that do not satisfy a triangle inequality condition for the specified search radius;
determine a distance between the query vector and each remaining document vector;
determine a specified number of nearest neighbor document vectors to the query vector based on the distance between the query vector and each remaining document vector; and
send the specified number of nearest neighbor document vectors to the coordinating computing device.

15. The system of claim 11, wherein the vantage point tree comprises a multi-vantage point tree comprising a plurality of vantage points for each node in the vantage point tree.

16. The system of claim 11, wherein the system memory comprises code configured to rank documents corresponding to the nearest neighbor document vectors based on a relevance of each document to a query corresponding to the query vector.

17. One or more computer-readable storage devices for storing computer-readable instructions, the computer-readable instructions providing a system for determining documents that are nearest to a query when executed by one or more processing devices, the computer-readable instructions comprising code configured to:
construct a vantage point tree based on a plurality of document vectors;
traverse the vantage point tree using one or more vantage points for each of a plurality of nodes in the vantage point tree by removing a portion of the plurality of document vectors from the vantage point tree based on a specified search radius centered about a query vector and a triangle inequality condition;
search the vantage point tree to determine a specified number of nearest neighbor document vectors to the query vector; and
remove a portion of the plurality of document vectors that are outside a hypersphere of the specified search radius for the query vector;
remove a portion of the plurality of document vectors that do not satisfy the triangle inequality condition; and
adjust the specified search radius such that only a specified number of nearest neighbor document vectors are remaining after document vectors that are outside the hypersphere of the specified search radius for the query vector and document vectors that do not satisfy the triangle inequality condition have been removed.

18. The one or more computer-readable storage devices of claim 17, wherein the computer-readable instructions comprise code configured to:
calculate a distance range between each remaining document vector and the query vector; and
determine the specified number of nearest neighbor document vectors to the query vector based on the distance between each remaining document vector and the query vector.

19. The one or more computer-readable storage devices of claim 17, wherein the computer-readable instructions comprise code configured to rank documents corresponding to the nearest neighbor document vectors based on a relevance of each document to a query corresponding to the query vector.

20. The method of claim 1, wherein the vantage point tree comprises a multi-vantage point tree.

* * * * *